US012647859B2

(12) United States Patent
Cao et al.

(10) Patent No.: US 12,647,859 B2
(45) Date of Patent: Jun. 2, 2026

(54) ELECTRONIC DEVICE, COMMUNICATION METHOD AND STORAGE MEDIUM

(71) Applicant: Sony Group Corporation, Tokyo (JP)

(72) Inventors: Jianfei Cao, Beijing (CN); Min Liu, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 303 days.

(21) Appl. No.: 18/552,193

(22) PCT Filed: Mar. 30, 2022

(86) PCT No.: PCT/CN2022/083931
§ 371 (c)(1),
(2) Date: Sep. 25, 2023

(87) PCT Pub. No.: WO2022/206801
PCT Pub. Date: Oct. 6, 2022

(65) Prior Publication Data
US 2024/0179590 A1    May 30, 2024

(30) Foreign Application Priority Data

Apr. 2, 2021    (CN) .......................... 202110358776.0

(51) Int. Cl.
*H04W 36/00*    (2009.01)
*H04W 36/08*    (2009.01)
(52) U.S. Cl.
CPC ..... *H04W 36/0085* (2018.08); *H04W 36/085* (2023.05); *H04W 36/0064* (2023.05)
(58) Field of Classification Search
CPC .......... H04W 36/0085; H04W 36/085; H04W 36/0064; H04W 36/0058; H04L 5/0032;
(Continued)

(56) References Cited

U.S. PATENT DOCUMENTS

2017/0207845 A1* 7/2017 Moon ..................... H04B 7/088
2019/0222286 A1* 7/2019 Miao ..................... H04L 5/0048
(Continued)

FOREIGN PATENT DOCUMENTS

CN    104980967 B    7/2019
CN    110381531 A    10/2019
(Continued)

OTHER PUBLICATIONS

International Search Report and Written Opinion mailed on May 20, 2022, received for PCT Application PCT/CN2022/083931, filed on Mar. 30, 2022, 8 pages including English Translation.
(Continued)

*Primary Examiner* — Rina C Pancholi
(74) *Attorney, Agent, or Firm* — XSENSUS LLP

(57)    ABSTRACT

The present disclosure relates to an electronic device, a communication method and a storage medium in a wireless communication system. There is provided an electronic device on user side, comprising a processing circuitry configured to: based on cell pre-configuration information, measure beams transmitted by a serving cell and at least one non-serving cell; in response to a predefined measurement-based event, send a beam report including at least L1 measurements and identification information for one or more beams of one or more non-serving cells to the serving cell via L1 or L2 signaling; determine an activated beam of the one or more beams; and set a non-serving cell associated with the activated beam as a serving cell.

20 Claims, 22 Drawing Sheets

(58) Field of Classification Search

CPC ..... H04L 5/001; H04L 5/0023; H04L 5/0048; H04L 5/0092; H04L 5/0007; H04L 5/0098; H04B 7/06952

See application file for complete search history.

(56) References Cited

U.S. PATENT DOCUMENTS

| | | | | |
|---|---|---|---|---|
| 2020/0068457 | A1* | 2/2020 | You | H04W 56/005 |
| 2020/0314673 | A1* | 10/2020 | Deogun | H04W 24/08 |
| 2020/0328780 | A1* | 10/2020 | Chen | H04B 7/022 |
| 2021/0204309 | A1* | 7/2021 | Babaei | H04L 5/001 |
| 2022/0095127 | A1* | 3/2022 | Tang | H04L 5/0098 |
| 2022/0295323 | A1* | 9/2022 | Wang | H04B 17/318 |
| 2023/0096338 | A1* | 3/2023 | Koskela | H04L 5/0091 370/331 |
| 2024/0073727 | A1* | 2/2024 | Zhou | H04W 24/10 |

FOREIGN PATENT DOCUMENTS

| | | |
|---|---|---|
| CN | 110463260 A | 11/2019 |
| CN | 112136339 A | 12/2020 |
| WO | 2019/220370 A2 | 11/2019 |
| WO | 2020/041972 A1 | 3/2020 |
| WO | 2020/119597 A1 | 6/2020 |
| WO | 2020/185141 A1 | 9/2020 |
| WO | 2020/200131 A1 | 10/2020 |

OTHER PUBLICATIONS

Huawei et al., "Mobility enhancements under CU-DU architecture", 3GPP TSG-RAN WG2 #106, R2-1907438, May 13-17, 2019, pp. 1-3.

Apple Inc: "On Beam Management Enhancement", 3GPP Draft; R1-2101350, 3rd Generation Partnership Project (3GPP), Mobile Competence Centre ; 650, Route Des Lucioles ; F-06921 Sophia-Antipolis Cedex ; France vol. RAN WG1, No. e-Meeting; Jan. 25, 2021-Feb. 5, 2021 Jan. 18, 2021 (Jan. 18, 2021), XP051970738.

Qualcomm Incorporated: "Enhancements on Multi-beam Operation", 3GPP Draft; R1-2101446, 3rd Generation Partnership Project (3GPP), Mobile Competence Centre ; 650, Route Des Lucioles ; F-06921 Sophia-Antipolis Cedex ; France vol. RAN WG1, No. Jan. Jan. 25, 2020-Feb. 5, 2020 Jan. 19, 2021 (Jan. 19, 2021), XP051971611.

SONY: "Considerations on the enhancement of multi-beam operation", 3GPP Draft; R1-2008346, 3rd Generation Partnership Project (3GPP), Mobile Competence Centre ; 650, Route Des Lucioles ; F-06921 Sophia-Antipolis Cedex ; France vol. RAN WG1, No. E-meeting; Oct. 26, 2020-Nov. 13, 2020 Nov. 1, 2020 (Nov. 1, 2020), XP052349703.

* cited by examiner

RRC Pre-configuration:  SC #0 (activated), NSC #A (not activated), NSC #B (not activated)
Intra-DU UE moving direction

```
                        CellGroupConfig information element

-- ASN1START
-- TAG-CELLGROUPCONFIG-START

-- Configuration of one Cell-Group:
CellGroupConfig ::=                          SEQUENCE {
    cellGroupId                                  CellGroupId,
    rlc-BearerToAddModList                       SEQUENCE (SIZE(1..maxLC-ID)) OF RLC-BearerConfig
OPTIONAL,   -- Need N
    rlc-BearerToReleaseList                      SEQUENCE (SIZE(1..maxLC-ID)) OF LogicalChannelIdentity
OPTIONAL,   -- Need N
    mac-CellGroupConfig                          MAC-CellGroupConfig
OPTIONAL,   -- Need M
    physicalCellGroupConfig                      PhysicalCellGroupConfig
OPTIONAL,   -- Need M
    spCellConfig                                 SpCellConfig
OPTIONAL,   -- Need M
    sCellToAddModList                            SEQUENCE (SIZE (1..maxNrofSCells)) OF SCellConfig
OPTIONAL,   -- Need N
    sCellToReleaseList                           SEQUENCE (SIZE (1..maxNrofSCells)) OF SCellIndex
OPTIONAL,   -- Need N
    ...,
    [[
    reportUplinkTxDirectCurrent                  ENUMERATED {true}
OPTIONAL     -- Cond BWP-reconfig
    ]],
    [[
    bap-Address-r16                              BIT STRING (SIZE (10))
OPTIONAL,   -- Need M
    bh-RLC-ChannelToAddModList-r16               SEQUENCE (SIZE(1..maxBH-RLC-ChannelID-r16)) OF BH-RLC-
ChannelConfig-r16 OPTIONAL,   -- Need N
    bh-RLC-ChannelToReleaseList-r16              SEQUENCE (SIZE(1..maxBH-RLC-ChannelID-r16)) OF BH-RLC-
ChannelID-r16       OPTIONAL,   -- Need N
    f1c-TransferPath-r16                         ENUMERATED {lte, nr, both}
OPTIONAL,   -- Need M
    simultaneousTCI-UpdateList1-r16              SEQUENCE (SIZE (1..maxNrofServingCellsTCI-r16)) OF
ServCellIndex        OPTIONAL,   -- Need N
    simultaneousTCI-UpdateList2-r16              SEQUENCE (SIZE (1..maxNrofServingCellsTCI-r16)) OF
ServCellIndex        OPTIONAL,   -- Need N
    simultaneousSpatial-UpdatedList1-r16         SEQUENCE (SIZE (1..maxNrofServingCellsTCI-r16)) OF
ServCellIndex        OPTIONAL,   -- Need N
    simultaneousSpatial-UpdatedList2-r16         SEQUENCE (SIZE (1..maxNrofServingCellsTCI-r16)) OF
ServCellIndex        OPTIONAL,   -- Need N
    uplinkTxSwitchingOption-r16                  ENUMERATED {switchedUL, dualUL}
OPTIONAL,   -- Need M
    uplinkTxSwitchingPowerBoosting-r16           ENUMERATED {enabled}
OPTIONAL    -- Need M
    ]]
}
```

FIG. 7

Cell Pre-configuration
Information

SC #0 configuration
parameters

NSC #A configuration
parameters

NSC #B configuration
parameters

Cell Pre-configuration
Information common configuration
parameters

SC #0 configuration
parameters ( Δ )

NSC #A configuration
parameters ( Δ )

NSC #B configuration
parameters ( Δ )

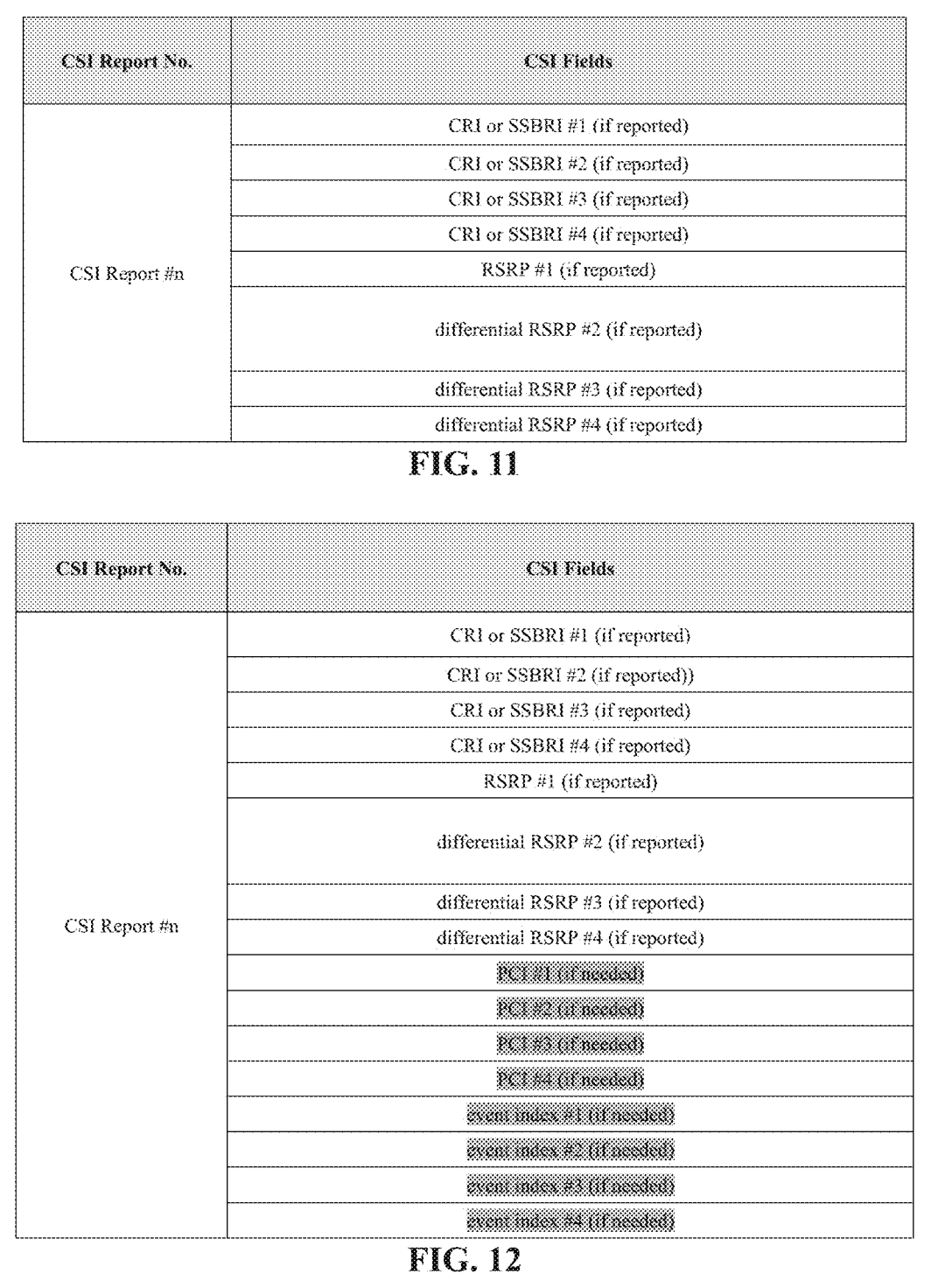

| CSI Report No. | CSI Fields |
|---|---|
| CSI Report #n | CRI or SSBRI #1 (if reported) |
| | CRI or SSBRI #2 (if reported) |
| | CRI or SSBRI #3 (if reported) |
| | CRI or SSBRI #4 (if reported) |
| | RSRP #1 (if reported) |
| | differential RSRP #2 (if reported) |
| | differential RSRP #3 (if reported) |
| | differential RSRP #4 (if reported) |

FIG. 11

| CSI Report No. | CSI Fields |
|---|---|
| CSI Report #n | CRI or SSBRI #1 (if reported) |
| | CRI or SSBRI #2 (if reported)) |
| | CRI or SSBRI #3 (if reported) |
| | CRI or SSBRI #4 (if reported) |
| | RSRP #1 (if reported) |
| | differential RSRP #2 (if reported) |
| | differential RSRP #3 (if reported) |
| | differential RSRP #4 (if reported) |
| | PCI #1 (if needed) |
| | PCI #2 (if needed) |
| | PCI #3 (if needed) |
| | PCI #4 (if needed) |
| | event index #1 (if needed) |
| | event index #2 (if needed) |
| | event index #3 (if needed) |
| | event index #4 (if needed) |

FIG. 12

| $C_7$ | $C_6$ | $C_5$ | $C_4$ | $C_3$ | $C_2$ | $C_1$ | R | Oct 1 |

| $C_7$ | $C_6$ | $C_5$ | $C_4$ | $C_3$ | $C_2$ | $C_1$ | R | Oct 1 |
|---|---|---|---|---|---|---|---|---|
| $C_{15}$ | $C_{14}$ | $C_{13}$ | $C_{12}$ | $C_{11}$ | $C_{10}$ | $C_9$ | $C_8$ | Oct 2 |
| $C_{23}$ | $C_{22}$ | $C_{21}$ | $C_{20}$ | $C_{19}$ | $C_{18}$ | $C_{17}$ | $C_{16}$ | Oct 3 |
| $C_{31}$ | $C_{30}$ | $C_{29}$ | $C_{28}$ | $C_{27}$ | $C_{26}$ | $C_{25}$ | $C_{24}$ | Oct 4 |

Network transmits channel of SC #0
via TRP of NSC #A fiber connection

Network transmits channel of SC #0
via TRP of NSC #A fiber connection

Network transmits channel of SC #0
via TRP of NSC #A fiber connection

ELECTRONIC DEVICE, COMMUNICATION METHOD AND STORAGE MEDIUM

CROSS-REFERENCE TO RELATED APPLICATIONS

This application is based on PCT filing PCT/CN2022/083931, filed Mar. 30, 2022, which claims priority from Chinese Patent Application No. 202110358776.0, filed Apr. 2, 2021, the entire contents of each are incorporated herein by reference.

FIELD OF THE INVENTION

The present disclosure relates generally to the field of wireless communications, and more particularly, to an electronic device, a communication method, and a storage medium for inter-cell mobility management based on Layer 1 or Layer 2 in a wireless communication system.

BACKGROUND

As the most advanced wireless communication standard at present, 5G NR (New Radio) provides higher communication rate and system capacity using higher frequency bands (e.g., FR1, which is referred to as sub-6 band, and FR2 located in a millimeter wave band). In addition, by using beamforming technology, it is possible to form a narrow directional beam against a large path loss existing in a high frequency channel and to achieve cell coverage by deploying multiple beams.

Due to the use of the higher frequency bands and the beamforming, the coverage of a cell and of each beam becomes limited. When a User Equipment (UE) moves, it requires more efficient mobility management by the NR communication system to ensure continuity of the communication. In standardization of 3GPP Rel. 15/16, management mechanisms for intra-cell mobility and inter-cell mobility are defined. The intra-cell mobility is done by means of beam management in Layer 1 (i.e., a physical layer), where the beam management in L1 includes beam measurement, reporting and beam indication on the UE side.

The inter-cell mobility is done in a manner of Layer 3 (i.e., a RRC layer). FIG. 1 simply shows a flow chart of cell switch. As shown in FIG. 1, a serving cell configures reference signals (RSs) for mobility of this cell and neighboring cells for the UE in advance by using RRC signaling, and the UE performs filtering and measurement in Layer 3 on these reference signals to obtain relatively average and converged measurements, and performs Radio Resource Management (RRM)-related reporting after a predefined Layer 3 event is triggered. The serving cell makes a switch decision based on the reported contents and sends a switch request to a target cell as decided. The target cell performs admission control and provides RRC configuration as a part of a switch request acknowledgement (ACK). Then, the serving cell sends an RRCReconfiguration message to the UE, and provides the RRC configuration of the target cell to the UE. The UE adjusts the configured RRC parameters and prepares for accessing the target cell. Also here, Layer 3 signaling is used, that is, an RRCReconfiguration Complete message is sent to the target cell so that the UE switches to the target cell.

In a protocol stack structure of a control plane (which is responsible for the mobility management) of the UE, Layer 3 is above Layer 1, and requires to be beared by a transport channel of Layer 1, so that both of signaling overhead and delay in Layer 3 are large. For a high-speed moving scenario or a scenario with a high requirement on latency, the traditional inter-cell mobility management has difficulty in meeting the requirement of the UE.

Therefore, there is a need to improve the existing inter-cell mobility management mechanisms.

SUMMARY OF THE INVENTION

The present disclosure provides aspects to meet the need as described above. The present disclosure proposes cross-cell beam management mechanisms based on Layer 1 or Layer 2 signaling, thereby achieving faster and more efficient inter-cell mobility management.

A brief summary regarding the present disclosure is given here to provide a basic understanding on some aspects of the present disclosure. However, it will be appreciated that the summary is not an exhaustive description of the present disclosure. It is not intended to identify key portions or important portions of the present disclosure, nor to limit the scope of the present disclosure. It aims at merely describing some concepts about the present disclosure in a simplified form and serves as a preorder of a more detailed description to be given later.

According to one aspect of the present disclosure, there is provided an electronic device on user side, comprising a processing circuitry configured to: based on cell pre-configuration information, measure beams transmitted by a serving cell and at least one non-serving cell; in response to a predefined measurement-based event, send a beam report including at least L1 measurements and identification information for one or more beams of one or more non-serving cells to the serving cell via L1 or L2 signaling; determine an activated beam of the one or more beams; and set a non-serving cell associated with the activated beam as a serving cell.

According to one aspect of the present disclosure, there is provided an electronic device on control side, comprising a processing circuitry is configured to: receive, from a user equipment (UE) and via L1 or L2 signaling, a beam report including at least L1 measurements and identification information for one or more beams of one or more non-serving cells; determine an activated beam of the one or more beams; and set a non-serving cell associated with the activated beam as a serving cell.

According to one aspect of the present disclosure, there is provided a communication method comprising: based on cell pre-configuration information, measuring beams transmitted by a serving cell and at least one non-serving cell; in response to a predefined measurement-based event, sending a beam report including at least L1 measurements and identification information for one or more beams of one or more non-serving cells to the serving cell via L1 or L2 signaling; determining an activated beam of the one or more beams; and setting a non-serving cell associated with the activated beam as a serving cell.

According to one aspect of the present disclosure, there is provided an communication method comprising: receiving, from a user equipment (UE) and via L1 or L2 signaling, a beam report including at least L1 measurements and identification information for one or more beams of one or more non-serving cells; determining an activated beam of the one or more beams; and setting a non-serving cell associated with the activated beam as a serving cell.

According to one aspect of the present disclosure, there is provided a non-transitory computer readable storage medium storing executable instructions which, when executed, perform any of the above communication methods.

DESCRIPTION OF THE DRAWINGS

A better understanding of the present disclosure may be achieved by referring to a detailed description given hereinafter in connection with accompanying drawings, wherein the same or similar reference signs are used to indicate the same or similar elements throughout the drawings. The drawings are to be included in the specification and form a part of the specification along with the following detailed descriptions, for further illustrating embodiments of the present disclosure and for explaining the theory and advantages of the present disclosure. Wherein.

FIG. 7 illustrates CellGroupConfig information element for configuring a cell group;

FIGS. 11 and 12 illustrate examples of beam report formats;

Further features and aspects of the present disclosure will become apparent from the following description with reference to the attached drawings.

DETAILED DESCRIPTION OF PREFERRED EMBODIMENTS

Various illustrative embodiments of the present disclosure will be described hereinafter with reference to the drawings. For purpose of clarity and simplicity, not all implementations of the embodiments are described in the specification. Note that, however, many settings specific to the implementations can be made in practicing the embodiments of the present disclosure according to specific requirements, so as to achieve specific goals of the developers. Furthermore, it will be appreciated that the developing work will be a routine task, despite complex and tedious, for those skilled in the art who benefit from the present disclosure.

In addition, it should be noted that to avoid obscure the present disclosure with unnecessary details, the figures illustrate only steps of a process and/or components of a device that are closely related to the technical solutions according to the present disclosure, and omit details that have little relation to the present disclosure. The following descriptions of the illustrative embodiments are merely explanatory and are not intended to be any limit to the scope of the present disclosure and the applications thereof.

For convenient explanation of the technical solutions of the present disclosure, various aspects of the present disclosure will be described below in context of the 5G NR. However, it should be noted that this is not a limitation on the scope of application of the present disclosure. One or more aspects of the present disclosure can also be applied to various existing wireless communication systems, such as the 4G LTE/LTE-A, or various wireless communication systems to be developed in future. The architecture, entities, functions, processes and the like as described in the following description are not limited to those in the NR communication system, and can be found in other communication standards.

System Overview

Figure 1:
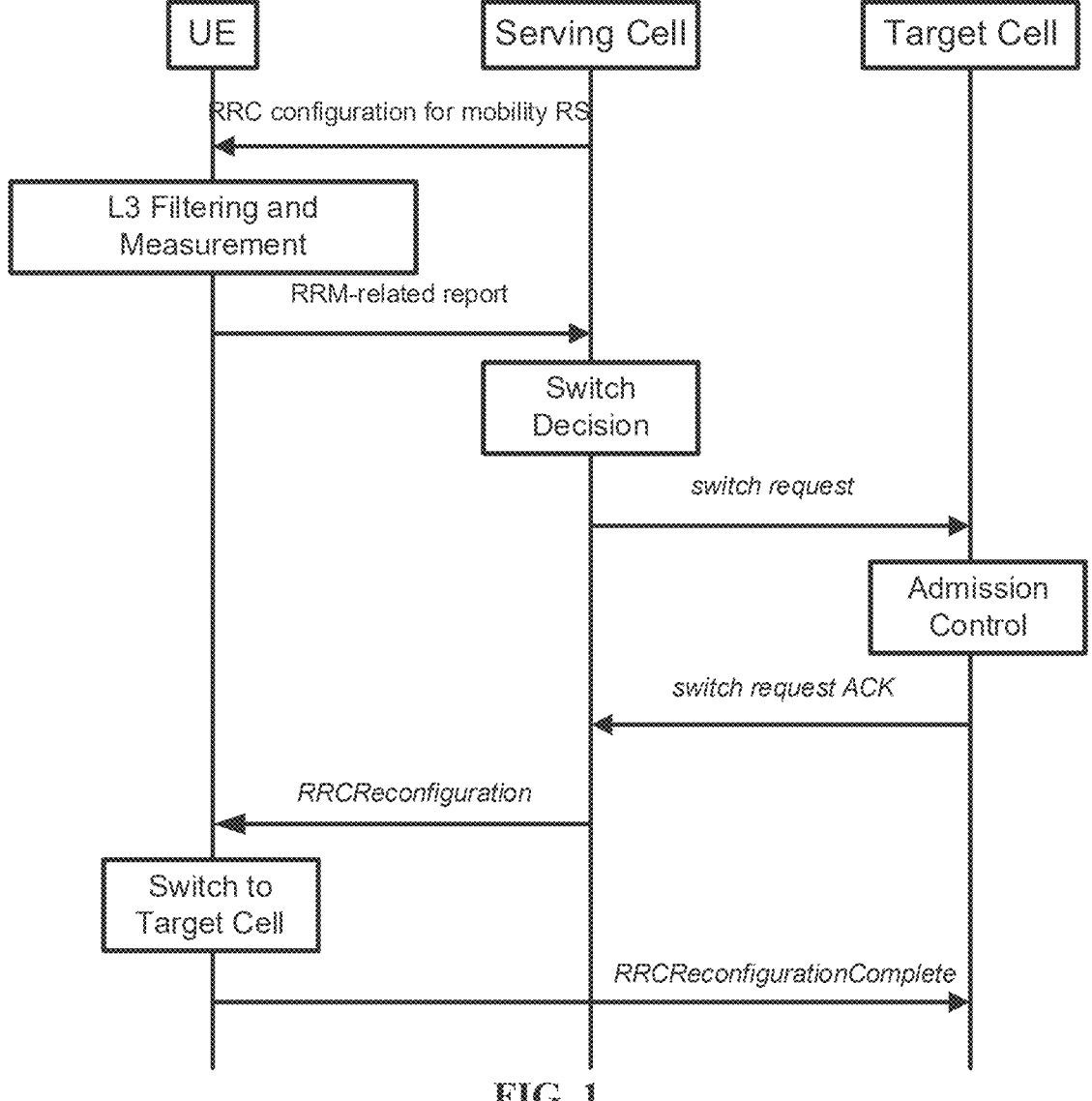
FIG. 1 illustrates a flowchart of conventional cell switch.
Figure 2:
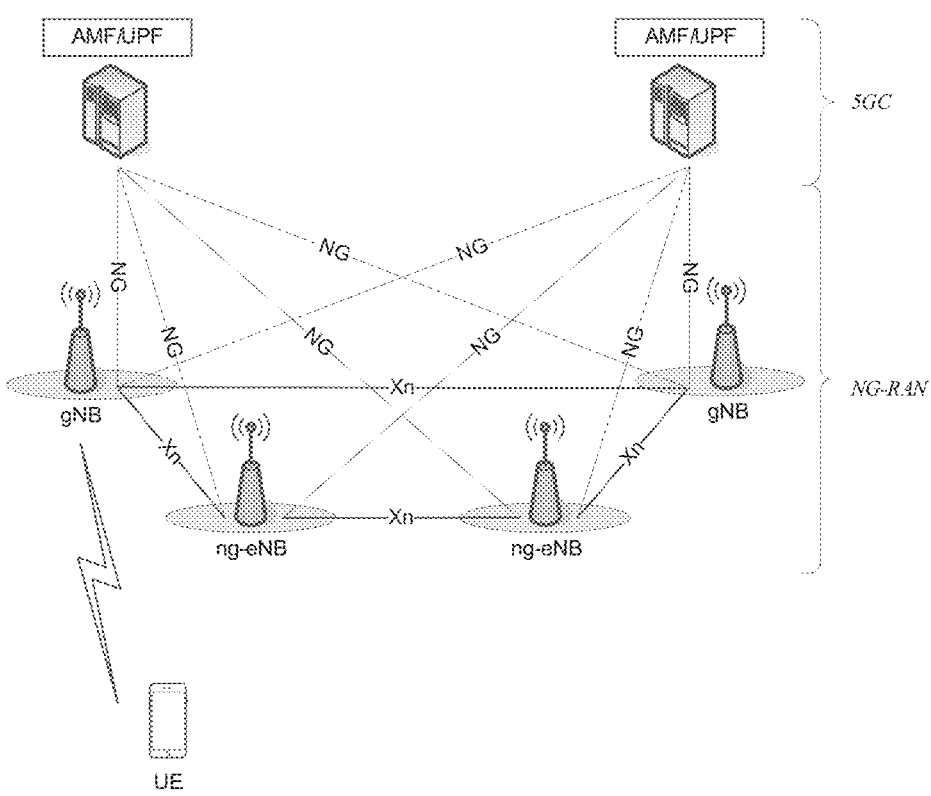
FIG. 2 illustrates a simplified diagram of architecture of an NR communication system.

FIG. 2 is a simplified diagram illustrating an architecture of the NR communication system. As shown in FIG. 2, on the network side, radio access network (NG-RAN) nodes of the NR communication system include gNBs and ng-eNBs, wherein the gNB is a newly defined node in the 5G NR communication standard, and it is connected to a 5G core network (5GC) via a NG interface, and provides NR user plane and control plane protocols terminating with a terminal equipment (also referred to as "user equipment", hereinafter simply referred to as "UE"); the ng-eNB is a node defined to be compatible with the 4G LTE communication system, and it can be upgradation of an evolved Node B (eNB) of the LTE radio access network, and provides user plane and control plane protocols for evolved universal terrestrial radio access (E-UTRA) terminating with the UE. Hereinafter. The gNB and ng-eNB are collectively referred to as "base station".

However, it should be noted that the term "base station" used in the present disclosure is not limited to the above two types of nodes, but serves as an example of a control device on the network side, and has a full breadth of its usual meaning. For example, in addition to the gNB and ng-eNB specified in the 5G communication standard, depending on scenarios in which the technical solution of the present disclosure is applied, the "base station" may also be, for example, an eNB in the LTE communication system, a remote radio head, a wireless access point, a control node in an automated factory or a communication device that performs similar functions, or an element thereof. Application examples of the base station will be described in detail in the following section.

Moreover, in the present disclosure, the term "UE" has a full breadth of its usual meaning, including various terminal devices or in-vehicle devices communicating with a base station. As an example, the UE may be a terminal device such as a mobile phone, a laptop, a tablet, an in-vehicle communication device, a sensor or an effector in an automated factory or the like, or an element thereof. Application examples of the UE will be described in detail in the following section.

Coverage area of the base station may be referred to as a "cell". As used in the present disclosure, the "cell" includes various types of cells. For example, the cell may include a macro cell, a micro cell, a pico cell, a home cell or the like, depending on transmission power and coverage of the base station. The cell is typically identified by a Physical Cell Identifier (PCI).

Figure 3:
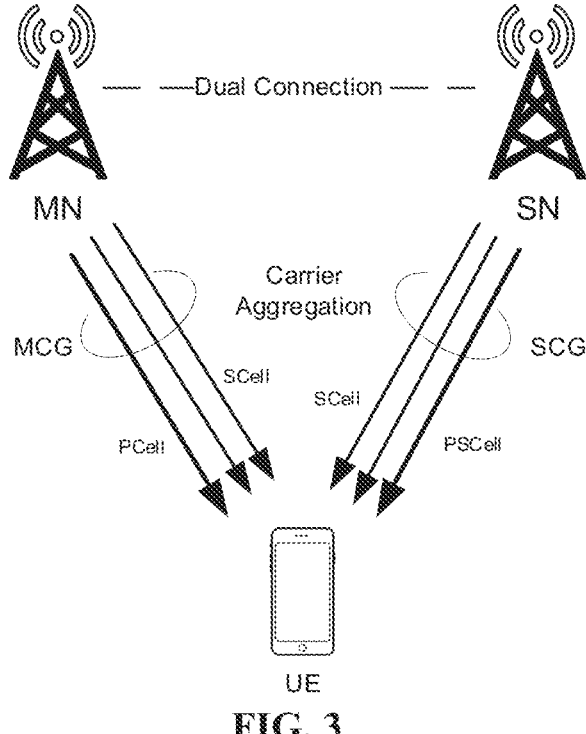
FIG. 3 illustrates various cells under dual connectivity, utilizing Carrier Aggregation (CA)

Typically, the base stations are in one-to-one correspondence with the macro cells, but other correspondence between the base station and the cell is possible. For example, FIG. 3 illustrates an example of the cells under dual connectivity. Under the dual connectivity, a UE simultaneously accesses a base station functioning as a master node (MN) and a base station functioning as a secondary node (SN), where the master node serves as an anchor point of the control plane, and may be a 4G base station, for example. In addition, if carrier aggregation is used, one base station may provide data transmissions to a UE using multiple component carriers (CCs) at the same time, in which each component carrier may correspond to one cell. The cells provided by the master node constitute a Master Cell Group (MCG), in which primary and secondary carriers are referred to as PCell and SCell, respectively. The cells provided by the secondary node constitute a Secondary Cell Group (SCG), in which primary and secondary carriers are referred to as PSCell and SCell, respectively. The PCell and the PSCell are collectively referred to as a special cell (sPCell) in protocols for convenience of description, since a lot of control signaling is sent only over them.

From a perspective of the UE, a cell which is providing a communication service to it may be referred to as a serving cell (SC), and correspondingly, a cell which is not providing a communication service to it may be referred to as a non-serving cell (NSC). In the present disclosure, mobility between a serving cell and a non-serving cell of the UE is mainly discussed, and is described mainly by taking a cell switch as example. In the scenario of carrier aggregation, the so-called cell switch is generally to switch a primary cell, PCell, to another cell. However, it should be understood that the inter-cell mobility to which the present disclosure applies may also include adding a non-serving cell as a secondary serving cell, SCell, for the UE. In a broader sense, the inter-cell mobility management involves a change in the serving cell of the UE.

Further, when describing behaviors of a cell in the present disclosure, the "cell" and the "base station" are often used interchangeably for ease of understanding, although these behaviors are actually accomplished by a corresponding base station.

Next, a NR radio protocol architecture for the base station and the UE in FIG. 2 is explained with reference to FIGS.

Figure 4A:
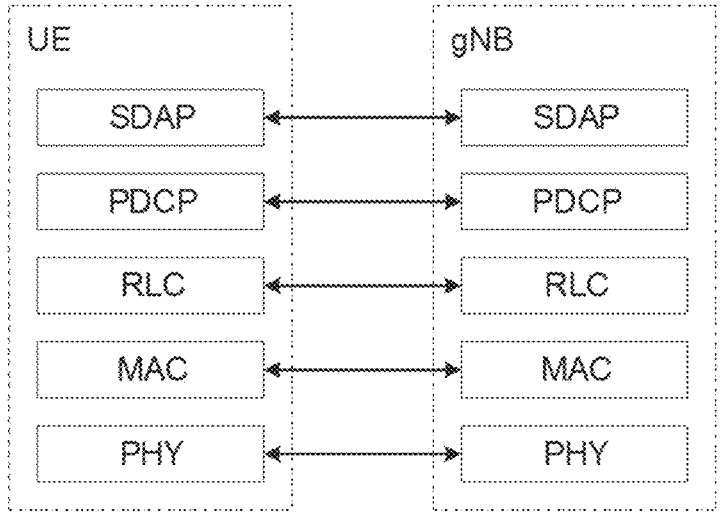
FIGS. 4A and 4B are NR radio protocol architectures for a user plane and a control plane, respectively.
Figure 4B:
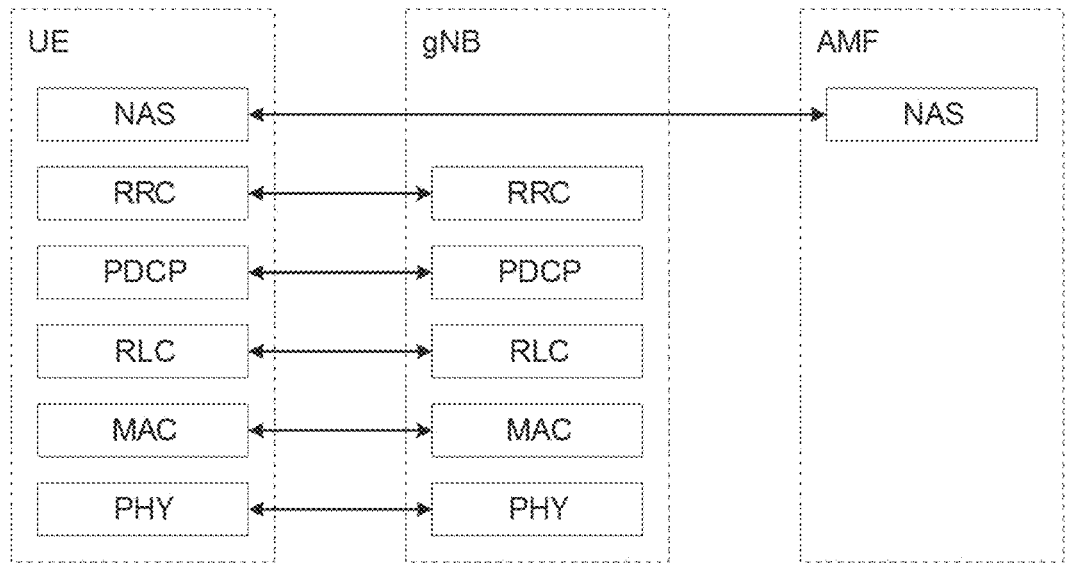

4A and 4B. FIG. 4A illustrates a radio protocol stack in the user plane for the UE and the gNB, and FIG. 4B illustrates a radio protocol stack in the control plane for the UE and the gNB. The radio protocol stacks are shown to have three layers: Layer 1, Layer 2 and Layer 3.

Layer 1 (L1) as the lowest layer is also called a physical layer, and implements various physical-layer signal processing to provide transparent transmission for signals. L1 provides physical transport channels for upper layers.

Layer 2 (L2) is above the physical layer and is responsible for managing links between the UE and the base station above the physical layer. In the user plane and the control plane, L2 includes a medium access control (MAC) sublayer, a radio link control (RLC) sublayer, and a packet data convergence protocol (PDCP) sublayer, which terminate at the base station (ng-eNB, gNB) on the network side, and terminate at the UE on the user side. In the user plane, a service data adaptation protocol (SDAP) sublayer is also included in the UE and the base station. In Layer 2, only the MAC sublayer is related to the mobility management, and thus Layer 2 mentioned in the present disclosure mainly refers to the MAC sublayer. In particular, the MAC sublayer is responsible for allocating various radio resources (for example, resource blocks) in a cellular cell among the UEs.

In the control plane, Layer 3 (L3), namely, Radio Resource Control (RRC) layer, is also included in the UE and the base station. The RRC layer is responsible for obtaining radio resources (i.e., radio bearers) and for configuring lower layers using RRC signaling between the base station and the UE. In addition, the UE performs functions such as authentication, mobility management, security control and the like with a non-access stratum (NAS) control protocol in a core network (AMF).

To support application of the MIMO technology, both the base station and the UE have many antennas, for example, tens, hundreds, or even thousands of antennas. For the antenna model, a mapping relationship between three tiers is generally defined around the antennas, so that the antenna model can smoothly support the channel model and the communication standard.

The lowest tier is the most basic physical unit, the antennas (also called antenna elements). Each of the antenna elements radiates electromagnetic waves according to respective amplitude parameter and phase parameter.

The antenna elements are arranged into one or more antenna arrays in a matrix form, and one antenna array can be composed of antenna elements of an entire row, an entire column, multiple rows and multiple columns. At this level, each antenna array actually constitutes an independently configurable transmit-receive unit (TXRU). Adjustment of an antenna pattern of the TXRU is implemented by configuring the amplitude parameters and/or phase parameters of the antenna elements forming the TXRU, so that the electromagnetic wave radiations emitted by all of the antenna elements form a narrow beam pointing to a specific spatial direction, that is, beamforming is implemented.

Finally, one or more TXRUs construct an antenna port seen at the system level through logical mapping. The "antenna port" is defined such that a channel carrying a symbol on one antenna port can be inferred from a channel carrying another symbol on the same antenna port. This means that different signals transmitted by the same antenna port experience the same channel environment.

In general, the antenna port may be characterized by a reference signal. There is a one-to-one correspondence between the antenna port and the reference signal, and different antenna ports are used to transmit different reference signals. The reference signal includes, for example: channel state information reference signal (CSI-RS), DM-RS, or the like. Moreover, in the beam management, Synchronization Signal Block (SSB) plays a similar role as the reference signal such as CSI-RS, and thus can be equated to the reference signal in the present disclosure.

A quasi-co-located (QCL) relationship may exist between different antenna ports. Two antenna ports are considered to be quasi co-located if a large-scale property of a channel carrying symbols on one antenna port can be inferred from a channel carrying symbols on the other antenna port. This means that, for example, when the QCL relationship is satisfied between Antenna Port A and Antenna Port B, the large-scale property parameters of the channel estimated from signals on Antenna Port A are also applicable to signals on Antenna Port B. The large-scale property includes at least one of: delay spread, doppler spread, doppler shift, average gain, average delay, and spatial reception parameters, etc. In this sense, the antenna port may be regarded as an identifier of a physical channel or a physical signal based on air interface environment, and the channel environments of the same antenna port have approximately the same changes.

As used in the present disclosure, the "spatial reception parameters" include beamforming parameters for forming a reception beam to achieve optimal reception of a beam signal from a corresponding spatial direction. Accordingly, "spatial transmit parameters" include beamforming parameters for forming a transmission beam pointing to a particular spatial direction. The spatial reception parameters and the spatial transmission parameters may be embodied as a spatial-domain reception filter and a spatial-domain transmission filter, respectively. In the present disclosure, for convenience of explanation, sometimes the transmission beam and the reception beam are not distinguished and will be collectively referred to as a "beam".

As the wireless channel environment changes, the beams used by the base station and the UE may also need to be changed accordingly. In the 5G NR, the base station and the UE determine the beams to be used for data transmission by performing beam scanning. Taking downlink scanning as example, the base station may sequentially transmit nr reference signals with nt beams, thereby transmitting nt×nr reference signals in total, and the UE may receive these reference signals with nr beams and measure them, for example, to obtain L1-RSRP, L1-SINR or the like, and report a predetermined number (for example, 2 or 4) of reference signals with the best measurements. The base station may select one of the reported reference signals and indicate it to the UE. Thus, the base station beam used for transmitting the reference signal and the UE beam used for receiving the reference signal will be determined as the optimal beam pair for subsequent data transmissions. Uplink scanning is similar in principle.

As the UE moves within a cell, a pair of the base station beam and the UE beam which currently best fit the channel condition may be selected through the beam scanning procedure as described above, such that the transmission beam is aligned to an Angle of Departure (AOD) of the channel and the reception beam is aligned to an Angle of Arrive (AOA) of the channel. Thus, intra-cell mobility management may be achieved by managing the beams. The above beam management mainly adopts signaling in L1 or L2, so as to accommodate the changes in the wireless channel flexibly and quickly.

In contrast, as introduced in the previous section, the inter-cell mobility management relies primarily on the measurement of signals and the transfer of RRC signaling in Layer 3. The L3 measurement requires a long time of filtering to obtain a converged result, and the coding and transmission of the RRC signaling require more processing resources and transmission resources, so it is not suitable for UEs moving at a high speed or UEs requiring a low latency.

In view of these, the present disclosure contemplates inter-cell mobility management mechanisms based on L1 and L2. It requires discarding the existing L3-based mobility management procedure. It is not feasible to directly follow the beam management approach currently used for the intra-cell mobility, because the UE cannot directly perform signaling interactions with a non-serving cell until the switch is successful. The present disclosure makes particular arrangements for aspects specific to the inter-cell mobility management so as to enable a more efficient procedure for changing the serving cell.

Exemplary Embodiments of the Present Disclosure

Exemplary embodiments of the present disclosure will be described in detail below with reference to the accompanying figures.

Figure 5:
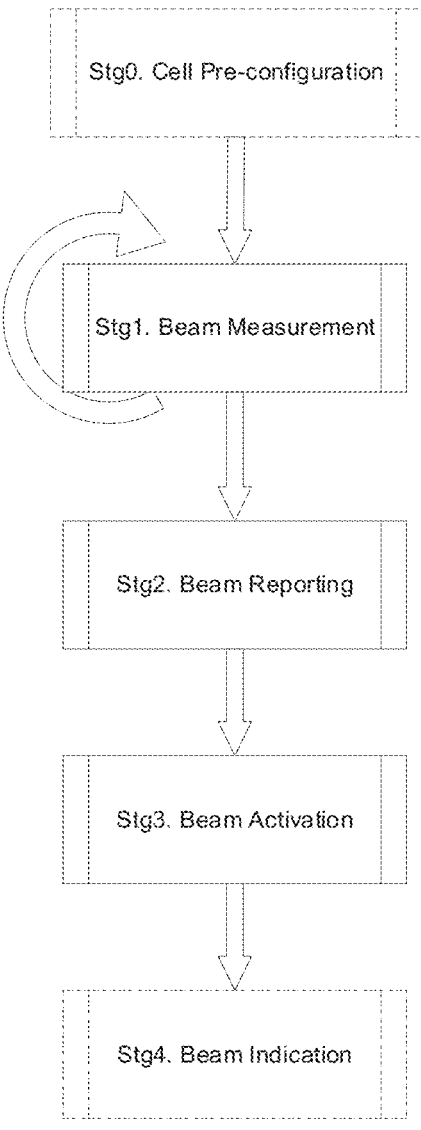
FIG. 5 illustrates a flow diagram of inter-cell mobility management according to the present disclosure.

FIG. 5 shows a flow diagram of the inter-cell mobility management according to the present disclosure, where stages such Stg0 for cell pre-configuration, Stg1 for beam measurement, Stg2 for beam reporting, Stg3 for beam activation, and Stg 4 for beam indication are shown.
Stg0. Cell Pre-Configuration As shown by a dashed-line block in FIG. 5, as a preparatory work for the inter-cell mobility management of the present disclosure, pre-configuration of necessary RRC parameters needs to be performed (Stg0). In current designs of Rel.15/R16 protocol, participation of the RRC-layer parameters is inevitable in order to support subsequent L1 and L2 functions, but according to embodiments of the present disclosure, the required RRC-layer parameters may be configured in advance, and interactions involving the RRC-layer signaling between the UE and the network in the following mobility management procedure is avoided as much as possible.

In the stage Stg0, the serving cell performs a plenty of cell-level parameter configuration for the UE through the RRC signaling. The RRC parameters of the serving cell which the UE is currently accessing are the most basic, for configuring how the UE operates correctly within that cell. The serving cell of the UE may be more than one, for example, in the carrier aggregation scenario, it is a cell group (e.g., a MCG or a SCG) including one sPCell and several sCells that serve the UE.

Figure 6:
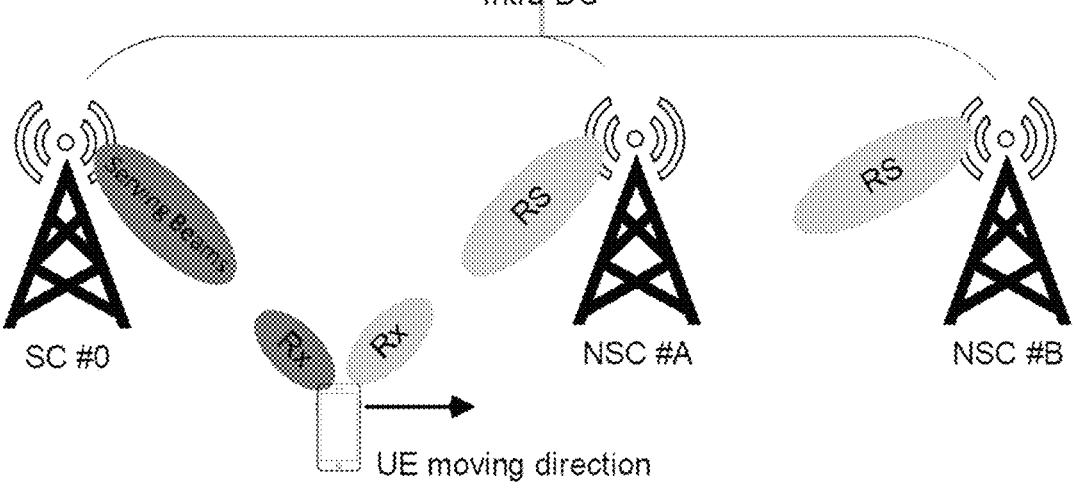
FIG. 6 illustrates an exemplary scenario of the inter-cell mobility.

The network may also configure the UE with RRC parameters of at least one non-serving cell in addition to the serving cell for use in subsequent inter-cell mobility procedure. How many non-serving cells and which non-serving cells are configured depends on an implementation inside the network. FIG. 6 illustrates an exemplary scenario of the inter-cell mobility, in which the network may predict, through estimation of a moving direction of the UE, potential cells NSC #A and NSC #B that the UE might request to enter, thereby configuring the RRC parameters of the cells SC #0, NSC #A and NSC #B in advance for the UE. Here, the cell SC #0 is in an active state for the UE, i.e., is the serving cell of the UE, and the cells NSC #A and NSC #B are in an inactive state, i.e., are the non-serving cells of the UE. It should be understood that the scenario illustrated in FIG. 6 is merely exemplary for purposes of illustration rather than limitation.

The serving cell SC #0 transmits RRC signaling including the cell pre-configuration information to the UE through its serving beam. The cell pre-configuration information may consist of many information elements (IEs), different information elements containing different configuration parameters. The RRC parameters may be configured using a nested relationship. For example, FIG. 7 shows an information element CellGroupConfig in TS 38.331 for configuring a cell group MCG or SCG, which has an information element spCellConfig further containing RRC parameters for a special cell sPCell.

According to embodiments of the present disclosure, the RRC parameters configured in advance by the serving cell includes at least identification information of each cell and its beams. The serving cell or non-serving cell may be identified by, for example, a PCI, and the beams of the cell may be identified by reference signals. For each cell, reference signals corresponding to a set of downlink beams for the cell may be configured in the RRC parameters. Thus, measuring these reference signals on the UE side is equivalent to the procedure of scanning these downlink beams.

Unlike the existing inter-cell mobility management, the reference signals available in the present disclosure are not limited to reference signals for the Layer 3 mobility measurement, such as SSB or CSI-RS for mobility, but are extended to reference signal resources for other purposes. For example, the reference signals configured for each cell may be reference signal resources for usage in Layer 1, including: SSB for initial access, CSI-RS for beam management, CSI-RS for tracking, CSI-RS for channel state information acquisition. In addition, the reference signals may also be downlink positioning reference signals, i.e., PRSs. The PRS is a downlink reference signal defined in Rel.16 for use in a cell or between cells in order to allow a UE to perform a positioning function by measuring the reference signal.

In the RRC parameters, the beam is identified by an index of an associated reference signal resource. In one example, the RRC parameters may directly refer to the beam with the index of the reference signal, such as an SSB resource indicator (SSBRI), a CSI-RS resource indicator (CRI), an index of a PRS resource, or the like. In addition to directly referring to the index of the reference signal, the RRC parameters may identify a beam by including a corresponding Transmission Configuration Indication (TCI) state.

Figure 8:
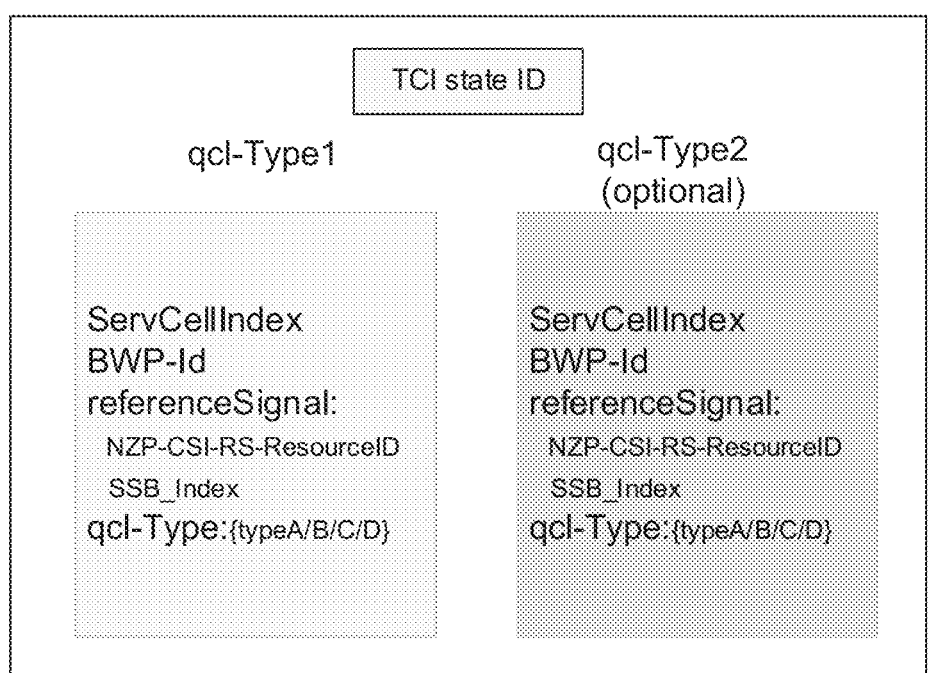
FIG. 8 illustrates configuration of a TCI state.

FIG. 8 illustrates a configuration of the TCI state. As shown in FIG. 8, the TCI state is identified by a TCI state ID. Each TCI state contains parameters for configuring a quasi-co-location (QCL) relationship between one or two downlink reference signals and a DMRS port of PDSCH/PDCCH. For the first downlink reference signal, the quasi co-location relationship is configured by the RRC layer parameter qcl-Type1. If there is the second downlink reference signal, the quasi co-location relationship is configured by qcl-Type2. As shown in FIG. 8, the parameter qcl-Type1 or qcl-Type2 includes the following information: a serving cell index ServCellIndex; a bandwidth part ID, BWP-Id; a source reference signal resource that provides QCL information, including an NZP-CSI-RS resource (identified by NZP-CSI-RS-ResoureId) and a SSB resource (identified by SSB-Index). The QCL Type corresponding to each downlink reference signal is given by the parameter qcl-Type and includes typeA, typeB, typeC, typeD, etc. Where typeD is a QCL relationship with respect to spatial reception parameters, meaning that a reference signal (e.g., DMRS) indicated by the TCI state can be received using spatial reception parameters (a reception beam) that previously received the source reference signal (e.g., SSB or CSI-RS) referenced in the TCI state. To avoid ambiguity, each TCI state typically is allowed to contain only one quasi-co-location hypothesis of "typeD".

A cell may set a set of TCI states for its set of beams, each of the TCI states referencing a reference signal corresponding to a beam. Thus, the TCI state may also be used to identify the corresponding beam. In the stage Stg0, the serving cell may configure the UE with the TCI states corresponding to the beams of the serving cell or a non-serving cell. The UE may decode the TCI states of each cell from the RRC parameters and find the referenced reference signals from the TCI states.

In addition to the RRC parameters as described above, the serving cell may also preconfigure any other useful parameters during the stage Stg0.

Optionally, the serving cell may also preconfigure RRC parameters related to measurement, such as but not limited to: a parameter regarding a measurement gap, parameters for beam consolidation/selection, parameters for L3 filtering for cell quality, parameters for L3 beam filtering, and the like.

Optionally, the serving cell may also preconfigure RRC parameters related to beam reporting, such as but not limited to: parameters for evaluating reporting criteria, a maximum number of beams to be reported, report format information, and the like.

Optionally, the serving cell may also preconfigure RRC parameters related to cell access, such as PRACH resources of a cell, in order to assist the UE in accessing the target cell.

Figure 9A:
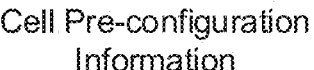
FIGS. 9A and 9B illustrate configurations of cell pre-configuration information.

Taking the scenario shown in FIG. 6 as example, the cell pre-configuration information sent by the serving cell to the UE may include respective RRC parameters of the cell SC #0 itself, the non-serving cell NSC #A, and the non-serving cell NSC #B. As shown in FIG. 9A, one copy of configuration parameters is included in the cell pre-configuration information separately for these cells.

Figure 9B:
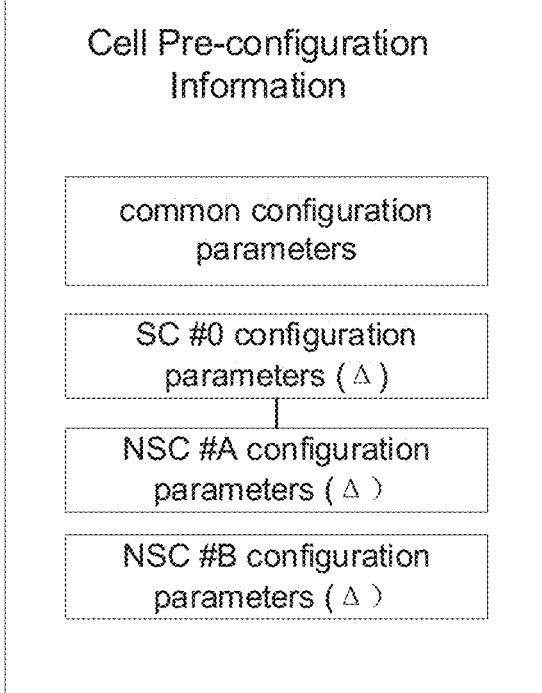

However, considering a large amount of storage for the cell-level RRC configuration, it is contemplated herein to implement differential configuration among cells. FIG. 9B illustrates an example of the differential configuration of the cell RRC parameters. As shown in FIG. 9B, the cell pre-configuration information may be composed of common configuration parameters and cell-specific configuration parameters. For example, the NW may configure most of the RRC parameters of SC #0, NSC #A, and NSC #B to be identical, and let the UE use the same set of RRC parameters. But for parameters that need to be distinguished between the cells, they can be configured individually for each of the cell, such as the ID (i.e., PCI, 0-1007) of each cell, the TCI states related to the PCI in each cell, and downlink reference signals of each cell that can be identified by the UE as being different from those of the current serving cell.

Stg1. Beam Measurement

Returning to FIG. 5, the UE may determine whether to trigger the mobility by performing beam measurements (Stg1). Triggering of the intra-cell mobility is not discussed here.

In an RRC_CONNECTED state, the UE measures a plurality of (at least one) beams of the current serving cell (e.g., SC #0) and non-serving cells (e.g., NS #A and NSC #B) based on the cell pre-configuration information provided in the stage Stg0.

Depending on whether the reference signal detected in the beam is configured for usage in Layer 1 or for usage in Layer 3, the UE may determine to perform a L1 measurement or a L3 measurement on the reference signal. The difference between the L1 measurement and the L3 measurement is briefly described herein with reference to FIG. 10.

Figure 10:
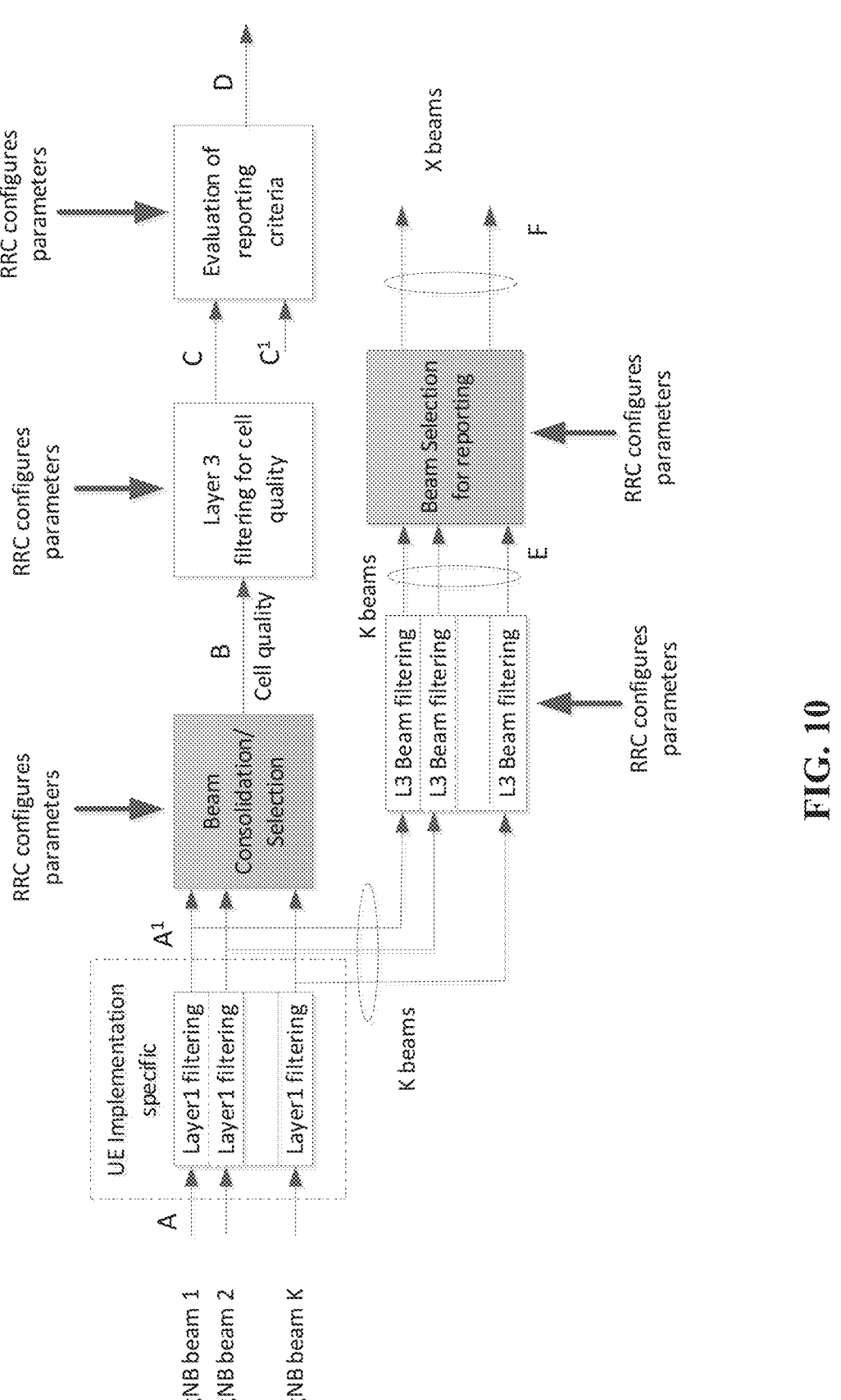
FIG. 10 illustrates a schematic diagram of a beam measurement model.

FIG. 10 illustrates a schematic diagram of a beam measurement model. The K beams as inputs to the model correspond to measurements of SSB, CSI-RS or PRS resources. The measurement model in FIG. 10 performs processing in the same manner for the serving cell and for the non-serving cell. The meaning of various modules and reference points in the measurement model is as follows.

A: measurements internal to L1, resulting in beam specific samples for UE detection.

L1 filtering: internal Layer 1 filtering of the inputs measured at point A. It is implementation-dependent at the UE, is not constrained by the standard protocols, and can obtain the measurements quickly.

$A^1$: measurements (i.e., beam specific measurements) reported by Layer 1 to Layer 3 after the Layer 1 filtering.

Beam consolidation/selection: the beam specific measurements are consolidated to derive a cell quality. The behavior of the beam consolidation/selection is standardized and the configuration of this module is provided by RRC signaling, that is, can be pre-configured in the stage Stg0. Reporting period at point B equals one measurement period at point $A^1$.

B: a measurement (i.e., the cell quality) derived from beam-specific measurements reported to Layer 3 after the beam consolidation/selection.

L3 filtering on cell quality: filtering performed on the measurements provided at point B. The behavior of the Layer 3 filters is standardized and the configuration of the Layer 3 filters is provided by RRC signaling, that is, can be pre-configured in the stage Stg0. Filtering reporting period at point C equals one measurement period at point B.

C: a measurement after processing in the Layer 3 filter. The reporting rate is identical to the reporting rate at point B. This measurement is used as input for one or more evaluation of reporting criteria.

Evaluation of reporting criteria: check is made on whether actual measurement reporting is necessary at point D. The evaluation can be based on more than one flow of measurements at reference point C, for example, to make a comparison between different measurements, as illustrated by input C and $C^1$. The UE shall evaluate the reporting criteria at least every time a new measurement result is reported. The reporting criteria are standardized and the configuration thereof is provided by RRC signaling (i.e., may be preconfigured at the stage Stg0).

D: measurement report information (message) sent on the radio interface.

L3 Beam filtering: filtering performed on the measurements (i.e., the beam specific measurements) provided at point $A^1$. The behavior of the beam filters is standardized and the configuration of the beam filters is provided by RRC signaling (i.e., may be preconfigured at the stage Stg0). Filtering reporting period at E equals one measurement period at $A^1$.

E: a measurement (i.e., beam-specific measurement) after processing in the beam filter. The reporting rate is identical to the reporting rate at point $A^1$. This measurement is used as input for selecting X measurements to be reported.

Beam selection for reporting: X measurements are selected from the measurements provided at point E. The behavior of the beam selection is standardized and the configuration of this module is provided by RRC signaling. (i.e., can be preconfigured at the stage Stg0).

F: beam measurement information included in a measurement report sent on the radio interface.

As can be seen from the measurement model in FIG. 10, filtering occurs at two different levels: L1 filtering at Layer 1 (the physical layer) for beam quality; L3 filtering at Layer 3 (RRC layer) for cell quality. In contrast, the L1 filtering may not require RRC parameters and have a UE-specific implementation, and thus may obtain measurements relatively quickly, but has a disadvantage in that the measurements may be unstable. For the L1 measurement, two measurement indexes, L1-RSRP and L1-SINR, can be obtained typically. The L3 filtering requires RRC parameters, and the UE needs to perform the filtering according to time-domain filtering parameters configured by the network, and although a more converged measurement can be obtained, more measurement time needs to be consumed. For the L3 measurement, three measurement indexes, L3-RSRP, L3-SINR and L3-RSSI, can be obtained typically.

According to embodiments of the present disclosure, as in the existing inter-cell mobility management, the UE may measure the L3 reference signals for mobility, including the SSB for mobility and the CSI-RS for mobility. The former may be based on RRC configuration, or discovered by the UE itself through frequency sweeping. The latter can only be RRC configured. In addition, with respect to the CSI-RS for mobility, the network preferably provides a QCL-typeD SSB to achieve time domain synchronization of the CSI-RS. For the reference signal in L3, the UE may perform the L3 measurement on it (including the L1 filtering and the L3 filtering) and trigger an event evaluation based on the measurement index at L3, i.e., the "evaluation of reporting criteria" module in FIG. 10.

Embodiments of the present disclosure then extend a range of reference signals available for the inter-cell mobility management. Specifically, the UE may also measure reference signals for L1 usage for each cell, including but not limited to: an SSB for initial access, which may be configured in advance by RRC, or may be autonomously detected by the UE; CSI-RS for beam management, tracking, or channel state information, given that there needs to be one SSB from the same cell with which it has a QCL-typeD relationship; and a positioning reference signal PRS.

For the reference signal of L1, the UE may perform only L1 measurements on it (including the L1 filtering) and trigger an event evaluation (not shown in FIG. 10) based on the measurement index in L1 (i.e., the measurement output by point $A^1$ in FIG. 10).

As indicated by the circular arrow in FIG. 5, the UE may continuously make beam measurements at a predetermined measurement period until a predetermined event is triggered.

Stg2. Beam Reporting

Beam reporting to the serving cell may be triggered by the measurements in the stage Stg1.

According to embodiments of the present disclosure, an event triggering the beam reporting may be based on the L3 measurement. For example, the several events based on the L3 measurement may be defined as follows:

L3-A1: the L3 measurement of the serving cell is better than an absolute threshold;

L3-A2: the L3 measurement of the serving cell is worse than an absolute threshold;

L3-A3: the L3 measurement of a non-serving cell is better than the PCell/PSCell by an amount of offset;

L3-A4: the L3 measurement for a non-serving cell is better than an absolute threshold;

L3-A5: the L3 measurement of the PCell/PSCell is worse than an absolute threshold and the L3 measurement of a non-serving cell/SCell is better than another absolute threshold.

For the above event L3-A1, the current serving cell can provide a good enough communication quality, and thus the inter-cell mobility may not be triggered, naturally the beam measurements do not have to be reported. When the event L3-A2 occurs, it shows that the serving cell cannot provide a desired communication quality, and thus the inter-cell mobility may be triggered, but since comparisons are not made with the measurements from non-serving cells, the UE does not know which of the non-serving cells is better, and the UE may measure all possible non-serving cells according to the preconfigured RRC parameters, that is, perform the beam measurements in Stg1, so as to obtain measurements of one or more non-serving cells.

For all of the events L3-A3 through L3-A5, a non-serving cell becomes better and the serving cell becomes worse. In this case, the UE knows which non-serving cell is getting better in performance, and thus it can selectively measure beams (reference signals) of the cell, thereby narrowing a range of measurements to reduce unnecessary overhead. Of course, the UE may also measure all possible non-serving cells to obtain an other non-serving cell whose L3 measurement index meets the requirement.

In addition to the L3 measurement on Layer 3 reference signals, the L1 measurement on Layer 1 reference signals may also trigger the beam reporting according to embodiments of the present disclosure. This is distinct from the existing inter-cell mobility management mechanisms.

Similarly, events based on the L1 measurement can be customized as follows:

L1-B1: the L1 measurement of the serving cell is better than an absolute threshold;

L1-B2: the L1 measurement of the serving cell is worse than an absolute threshold;

L1-B3: the L1 measurement of a non-serving cell is better than the PCell/PSCell by an amount of offset;

L1-B4: the L1 measurement of a non-serving cell is better than an absolute threshold;

L1-B5: the L1 measurement of the PCell/PSCell is worse than an absolute threshold and the L1 measurement of a non-serving cell/SCell is better than another absolute threshold.

For the event L1-B1, the inter-cell mobility may not be triggered, and the beam measurements do not have to be reported. The inter-cell mobility may be triggered when the event L1-B2 occurs. The UE may measure all possible non-serving cells according to the pre-configured RRC parameters, that is, perform the beam measurements in Stg1 to obtain measurements for one or more non-serving cells.

For all of the events L1-B3 through L1-B5, a non-serving cell becomes better and the serving cell becomes worse. Since the UE knows which non-serving cell is getting better, it can selectively report the beams (reference signals) of that cell. Of course, the UE may also measure all possible non-serving cells to obtain an other non-serving cell whose L1 measurement index meets the requirement.

As described above, when an event based on the L3 measurement or an event based on the L1 measurement is triggered, the UE may acquire beam measurements of the non-serving cell which triggers the event, or of all non-serving cells. In one example, in response to the event being triggered, the UE may commence performing the L1 measurement on beams of the non-serving cell in next measurement period to obtain an index such as L1-RSRP, L1-SINR, or the like. In another example, in response to the event being triggered, the UE may obtain L1 measurements for beams of the non-serving cell from measurements of the current measurement period (i.e., measurements that have triggered the event) without waiting for the next measurement period. As shown in the measurement model in FIG. 10, even the L3 measurement undergoes L1 filtering, that is, indexes such as L1-RSRP, L1-SINR, and the like can be generated midway. Therefore, in a case that the above events L3-A2 to L3-A5 are triggered, the UE may derive the L1 indexes to be reported from the measurements in the current measurement period.

The UE may select beam measurements to be reported according to the reporting configuration parameters as preconfigured at the stage Stg0. Typically, the UE may be configured to report at most X (e.g., X is 2, 4, 8, etc.) beams, and thus the UE may select the X beams with the best L1 measurements for reporting. The UE may preferably report two or more beams for reference by the serving cell in making cell switch decisions. Preferably, the UE may report one beam per non-serving cell, which is equivalent to reporting X candidates of the target cell to be switched to for selection by the serving cell. Further, the UE may select beams of a non-serving cell that has better L1 measurements than the serving cell because the UE always wants to be switched to a cell with a better communication quality.

Alternatively, the UE may have stronger autonomy, and the UE itself selects a non-serving cell that it wishes to access from one or more non-serving cells. At this time, the UE may select one non-serving cell having the best performance based on the measured L1 indexes (such as L1-RSRP, L1-SINR) of the non-serving cells, and report only the beam measurement of that cell. In this case, the serving cell has no more choice in making cell decisions.

The UE may report the beam measurements to the serving cell in various ways.

In one example, the UE forms identification information and the L1 measurements of the beams of the non-serving cells that are determined to be reported into a beam report. FIG. 11 illustrates a CSI report as an example of the beam report. As shown in FIG. 11, a beam to be reported is identified by an index of its reference signal, such as CRI or SSBRI, and of course also an index of a PRS resource (not shown), and the L1 measurements of the 2nd, 3rd, and 4th beams (if any, the number is not limited to 4) are differential measurements relative to the 1st beam, such as differential RSRPs. In this example, the UE may use the existing beam report format without changing the report format.

It should be noted that contents of the beam report should be unambiguous to both of the UE and the serving cell. For example, the serving cell should be able to know which cell a reference signal index (e.g., CRI, SSBRI) listed in the beam report belongs to. For example, if a reference signal of a certain non-serving cell is also configured in a reference signal set of the serving cell, the serving cell cannot determine whether the reference signal is from the cell itself or from the non-serving cell by virtue of only the reference signal index. In this case, the UE also needs to include information about which cell the reference signal comes from in the beam report, for example, as shown in FIG. 12, the contents reported by the UE may include a PCI of the non-serving cell to which the reference signal belongs.

However, if identification information of the cell has already been included in the index of the reference signal, then it is not necessary to be specified in the beam report. For example, if indexes of CSI-RS resources from the serving cell are from 0 to N−1, while indexes of CSI-RS resources from a non-serving cell are from N to M−1, the serving cell may distinguish whether a reference signal index reported by the UE is from the serving cell or from the non-serving cell. Furthermore, the SSB itself consists of a Primary Synchronization Signal (PSS) and a Secondary Synchronization Signal (SSS), and 3×336-1008 different PCIs can be expressed based on a sequence ID (0 to 2) of the PSS and a sequence ID (0 to 335) of the SSS. In this case, the UE may not need to report the PCI.

In addition, the UE may preferably also report information about the triggered measurement event for use by the serving cell in making switch decisions. As shown in FIG. 12, an index of the triggered measurement event (e.g., L3-A2 to L3-A5, or L1-B2 to L1-B5 as listed above) associated with each reference signal may be included in the beam report. When the serving cell knows a type of the event, it can perform mobility management on the UE pertinently. Of course, this information is not necessary, and if the serving cell does not know the type of the event, coarse mobility management can be performed based on the reported L1 measurements of the non-serving cells.

In addition to the CSI reports in FIGS. 11 and 12, the UE may organize the contents that have to be reported into another format. While following the CSI report format may be compatible with the existing beam management mechanisms to the full extent, it is possible to define a new report format that is more suitable for the inter-cell mobility management.

According to embodiments of the present disclosure, the beam reporting is done in Layer 1 or Layer 2. In one example, the UE may complete the reporting via Uplink Control Information (UCI) carried by Physical Uplink Control Channel (PUCCH). In another example, the UE may complete the reporting via UCI or MAC control element (MAC CE) carried by Physical Uplink Shared Channel (PUSCH). The UCI belongs to control signaling in Layer 1, and the MAC CE belongs to control signaling in Layer 2.

The UE may report the reference signals (e.g., CRIs, SSBRIs, PRS index identifiers) and the L1 measurements (e.g., L1-RSPRs, L1-SINRs) corresponding to the beams in the UCI or MAC CE, and optionally the cell identification information, the type of the measurement event, and the like. Alternatively, the UE may also include the TCI states associated with the beams in the MAC CE. As shown in FIG. 8, identification information (ServCellIndex) of a cell and a reference signal corresponding to a beam may be included in the TCI state, and thus may also be used as identification information of the beam.

Conventionally, the beam reporting may be triggered by the serving cell, including periodic reporting, semi-static reporting, aperiodic reporting, and the UE may perform the reporting on available transmission resources that are configured in advance or temporarily scheduled by the serving cell, such as PUCCH resources or PUSCH resources.

However, it is more preferable for the UE to trigger the beam reporting, since unnecessary overhead can be avoided for the system. When the UE needs to perform the beam reporting, the UE may request PUCCH resources or PUSCH resources from the serving cell, so as to send the UCI or MAC CE including the contents to be reported.

When the beam reporting is performed by a PUCCH carrying the UCI, the UE does not know whether the network has correctly received the report or not, because there is no acknowledgement mechanism for the transmission of PUCCH. According to an embodiment of the present disclosure, introducing a special control mechanism is contemplated, in which the serving cell may pre-configure the UE with a maximum transmission number N for the beam reporting (for example, configured in the pre-configuration stage Stg0 as described above). When the UE sends the beam report, if no response (for example, beam activation information as described later) is received from the serving cell within a certain time period, a counter at the UE is incremented by 1, and then the UE re-sends the beam report until the response from the serving cell is received or the maximum transmission number N is reached. If the PUCCH transmissions of the maximum transmission number N are unsuccessful, the UE may consider that the uplink of the serving cell is out of synchronization, and perform an initial access again.

When the beam reporting is performed with a PUSCH carrying the UCI or MAC CE, the transmission of the PUSCH itself has an implicit error control, that is, when the transmission fails, UE will receive a NACK, and if UE does not receive a NACK, it shows that transmission is successful. Therefore, the UE can know whether the network has correctly received the UCI or the MAC CE. However, alternatively, the above-mentioned control mechanism may also be introduced into the transmission of the PUSCH, that is, the maximum transmission number for the beam reporting performed by the UE is specified. When the UE fails in attempts of the maximum transmission number, it may consider to abandon the PUSCH transmission since the uplink of the serving cell is out of synchronization, and thus perform the initial access again.

It should be understood that although in the above descriptions, the UE reports only the beam measurements of the non-serving cells, the UE may report the beam measurements of the serving cell as well, for reference by the serving cell in performing the mobility management. The reported contents of the serving cell have no difference from those of the non-serving cell, and thus is not described herein again.

Stg3. Beam Activation

Upon receiving the beam report from the UE, the serving cell performs the inter-cell mobility management for the UE.

Specifically, in one example, the inter-cell mobility includes cell switch, that is, the UE is switched from the current serving cell to a certain non-serving cell. The serving cell decides whether or not the switch is necessary and further to which non-serving cell, based on the beam measurements of each cell included in the beam report. Depending on a specific switch strategy, the serving cell may also consider other factors besides the reported L1 measurements, such as the type of the event triggering the beam reporting, the UE's movement trajectory, and the like. The switch decision belongs to an internal implementation of the network and may vary from the switch strategies, and is not described in detail here.

In another example, the inter-cell mobility includes addition or deletion of a secondary serving cell (SCell). The serving cell decides whether or not a non-serving cell needs to be added as a SCell for the UE based on the beam measurements of each cell included in the beam report. For example, the serving cell may see from the L1 measurements reported by the UE that the communication quality of a certain non-serving cell (e.g., NSC #A in FIG. 6) becomes better, and decide to add that non-serving cell to the MCG or SCG for the UE without changing the PCell or PSCell.

No matter what kind of inter-cell mobility, the serving cell needs to select one or more from the non-serving cell candidates reported by the UE as a replacement or addition to the current serving cell. In the present disclosure, setting a selected non-serving cell as a serving cell (sPCell or SCell) may be referred to as "activating" the non-serving cell.

Preferably, prior to finally deciding which non-serving cell to activate, the serving cell may attempt to send a switch request to a non-serving cell candidate that is preliminarily selected, asking whether the non-serving cell accepts the switch. If a positive Acknowledgement (ACK) is received for the switch request, the serving cell determines that the non-serving cell may be activated, otherwise determines that the non-serving cell does not allow the UE to access, and selects another non-serving cell candidate instead.

However, in a case that the UE autonomously selects which non-serving cell to activate, the UE reports the beam measurements of only one non-serving cell. The serving cell has no other choice and may only consider a possibility of switching to that non-serving cell in the switch decision, for example, by sending a switch request to the non-serving cell asking whether it accepts the switch or not, and determining that the non-serving cell can be activated if an ACK is received for the switch request.

Once the non-serving cell to be activated is decided, the serving cell may inform the UE of the decision. Depending on a specific decision strategy, the non-serving cell to be activated may not be limited to one. According to an embodiment of the present disclosure, activation of the non-serving cell may be achieved through activation of an associated beam. The serving cell may transmit beam activation information to the UE through signaling in L1 or L2.

In one example, the serving cell may transmit a MAC CE including the beam activation information to the UE through PDSCH. The MAC CE is control signaling in Layer 2. The MAC CE may be a MAC CE for activating a TCI state, wherein the TCI state associated with the activated beam is activated. Upon receiving the MAC CE, the UE finds from the TCI state a reference signal contained therein, thereby knowing that the beam corresponding to the reference signal has been activated, which also means that the associated non-serving cell is activated.

In another example, the serving cell may transmit DCI containing the beam activation information to the UE through PDCCH or PDSCH. DCI is control signaling in Layer 1. The DCI may be used to dynamically activate or update the TCI state indicated therein. Upon receiving the DCI, the UE finds from the TCI state a reference signal contained therein, thereby knowing that the beam corresponding to the reference signal has been activated, which also means that the associated non-serving cell is activated.

In addition to utilizing the TCI state, the serving cell may also directly reference an index of the reference signal corresponding to the activated beam in the MAC CE or DCI as long as it can convey which beam or beams are activated.

In response, the UE may set the non-serving cell associated with the activated beam as a serving cell. For example, the UE may switch from the current serving cell to the non-serving cell, including commencing an initial access procedure with the non-serving cell, establishing an RRC connection with the non-serving cell, and disconnecting an RRC connection with the serving cell.

Figure 13:
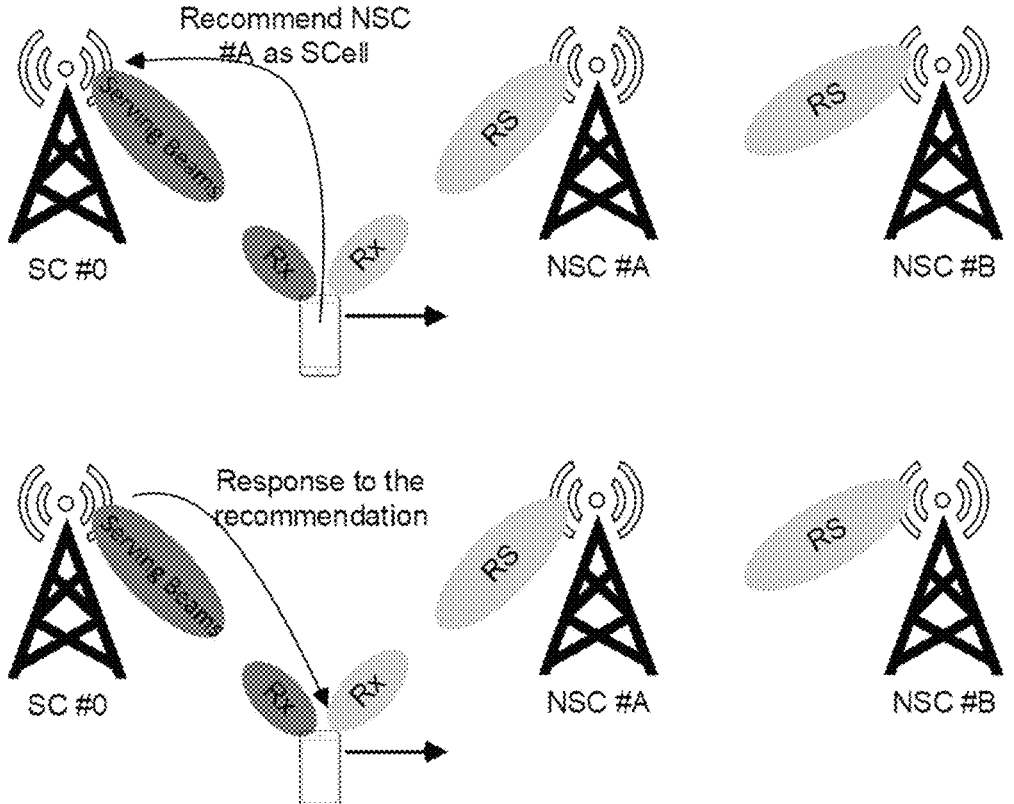
FIG. 13 illustrates a schematic diagram of a UE setting a non-serving cell as an SCell.

Alternatively, the UE may add the non-serving cell associated with the activated beam as a secondary serving cell. For example, as shown in FIG. 13, the UE may include, for example, beams of NSC #A in the beam report in the beam reporting stage (Stg2), which is equivalent to recommending NSC #A as an SCell for the UE, and as a response to the recommendation from the UE, SC #0 may activate a beam of NSC #A using downlink signaling such as MAC CE or DCI in the beam activation stage (Stg3), thereby activating NSC #A as an SCell.

Figures 14A, 14B:
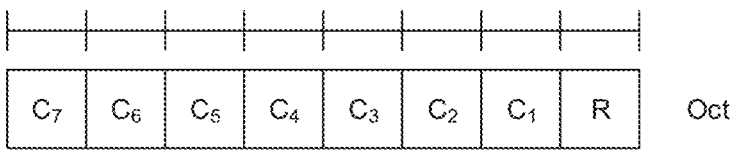
FIGS. 14A and 14B illustrate examples of a MAC CE for activating an SCell.

Of course, other signaling to activate a SCell is possible. FIGS. 14A and 14B illustrate two MAC CE formats that the serving cell can use to activate/deactivate an SCell, where the upper MAC CE has 1 octet and the lower MAC CE has 4 octets. In each MAC CE, R is a reserved bit and $C_1$ indicates a state of corresponding SCell. If $C_i$ is set to 1, it means that if an SCell indexed by ScellIndex i is configured for the MAC entity, the SCell indexed by SCellIndex i is activated, and if $C_i$ is set to 0, the SCell indexed by ScellIndex i is deactivated. In response to receiving the MAC CE activating the cell NSC #A, the UE may start an initial access procedure with NSC #A, which is not described in detail herein.

Stg4. Beam Indication

After the non-serving cell is set as the serving cell, the UE may establish an RRC connection with the cell through an initial access procedure, and then may perform downlink or uplink transmissions with the cell.

To perform PDCCH or PDSCH transmissions with the UE, the activated non-serving cell (which has now become a new serving cell but is still referred to as the non-serving cell for differentiation) needs to indicate to the UE the beam used for receiving the PDCCH or PDSCH.

According to embodiments of the present disclosure, the non-serving cell may perform the beam indication through signaling in L1 or L2 in the stage Stg4 in FIG. 5. The signaling in L1 may include DCI, and the signaling in L2 may include MAC CE. In the downlink signaling, mainly a QCL relationship between two reference signals is conveyed.

A beam indication mechanism using the TCI state is applicable to the beam indication of the present disclosure. As mentioned previously, when DMRS of PDCCH or PDSCH is indicated, the TCI state conveys a QCL-typeD relationship between a reference signal (e.g., SSB, CSI-RS) referenced therein and the DMRS, which means that the UE can receive the DMRS of PDCCH or PDSCH using spatial reception parameters (a reception beam) previously used to receive the reference signal in the TCI state. Two kinds of QCL indications are presented here.

The first kind is a direct QCL indication. Such direct beam indication means going directly from one reference signal to another.

Assuming that DMRS of PDCCH or PDSCH of a non-serving cell is to be indicated, the following QCL indication may be considered:

Alt.1 SSB/CSI-RS/PRS (NSC)→PDCCH DMRS/ PDSCH DMRS (NSC)

Where, on the left side of the arrow is a reference signal referenced in the TCI state (i.e., a source reference signal indicated for the QCL), which may be a reference signal from the non-serving cell measured by the UE in the stage Stg1, including: a reference signal in L1, such as SSB, CSI-RS, PRS or the like in L1; and a reference signal in L3, such as SSB, CSI-RS or the like. On the right side of the arrow is a target reference signal indicated for the QCL, which may be DMRS of PDCCH or PDSCH of the non-serving cell.

Figure 15A:
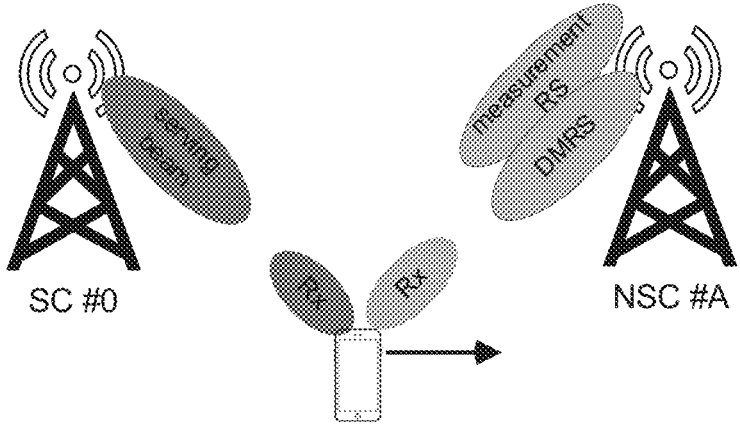
FIGS. 15A-15B illustrate schematic diagrams of direct beam indications.

FIG. 15A shows an exemplary scenario utilizing the QCL indication as described above. In FIG. 15A, SC #0 is a serving cell before the mobility management, and NSC #A is a non-serving cell activated in the mobility management. As shown in FIG. 15A, both a source reference signal ("measurement RS" in FIG. 15) and a target reference signal ("DMRS") are from NSC #A, and have a QCL relationship of typeD therebetween, and thus when performing the PDCCH or PDSCH transmission, the cell NSC #A transmits PDCCH or PDSCH using a beam which transmitted the measurement RS, and accordingly, the UE receives the PDCCH or PDSCH using a beam which received the measurement RS.

Figure 15B:
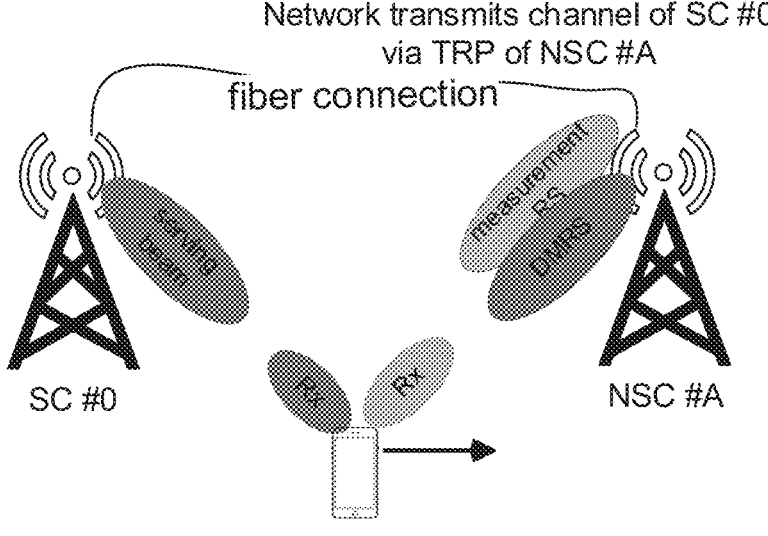

Alternatively, in implementing the serving cell, from a perspective of the network, the network may transmit PDCCH/PDSCH DMRS of the serving cell to the UE by a Transmit Receive Point (TRP) of the non-serving cell. For example, as shown in FIG. 15B, when there is a relatively good, large-capacity, low-latency connection (e.g., a fiber connection) between SC #0 and NSC #A, the PDCCH or PDSCH of SC #0 may be transmitted to NSC #A via the fiber connection and then transmitted by the TRP of NSC #A. Thus, in this case, the following QCL indications may be considered:

Alt.2 SSB/CSI-RS/PRS (NSC)→PDCCH DMRS/ PDSCH DMRS (SC)

Where on the left side of the arrow is a source reference signal referenced in the TCI state, which may be a reference signal from the non-serving cell measured by the UE in the stage Stg1, including: a reference signal in L1, such as SSB, CSI-RS, PRS or the like in L1; and a reference signal in L3, such as SSB, CSI-RS or the like. On the right side of the arrow is a target reference signal indicated for the QCL, which may be DMRS of PDCCH or PDSCH of the serving cell.

The second kind is a non-direct QCL indication. The indirect QCL relationship means that a source reference signal for the QCL needs to pass the QCL relationship to a final DMRS through an intermediate reference signal. Taking SSB as example, after the UE completes the initial access and enters the RRC_CONNECTED state, considering that the SSB has a bandwidth of only 20 PRBs and a time-domain length of 4 OFDM symbols, it is no longer suitable to serve as a QCL source for the UE. Therefore, a reference signal having a QCL-TypeD relationship with the SSB is required to function as an intermediate RS for conveying the QCL relationship to another reference signal, i.e., DMRS of PDCCH/PDSCH.

Assuming that DMRS of PDCCH or PDSCH of a non-serving cell is to be indicated, the following QCL indications may be considered:

Alt.3 SSB/CSI-RS/PRS (NSC)→TRS/CSI-RS (NSC) →PDCCH DMRS/PDSCH DMRS (SC)

Figure 16A:
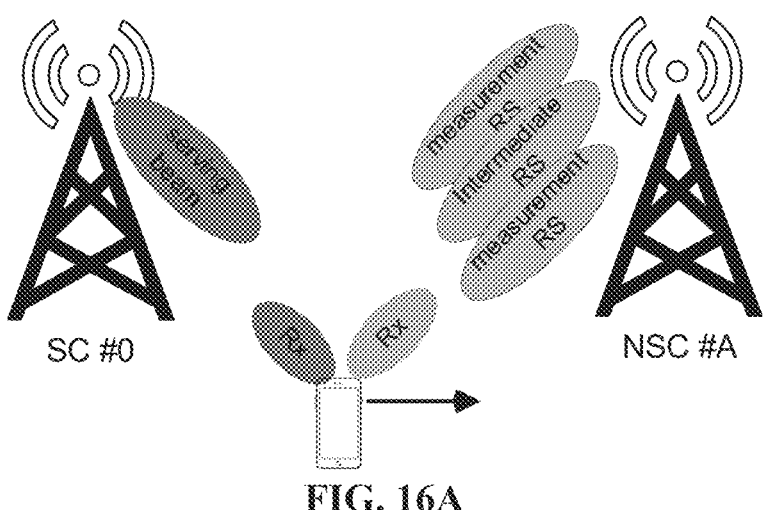
FIGS. 16A-16C illustrate schematic diagrams of indirect beam indications.

Here, the leftmost reference signal should have been a QCL source for the DMRS, but this reference signal might not be suitable for the beam indication due to various reasons, for example, there is no TCI state corresponding to the reference signal, the TCI state corresponding to the reference signal does not indicate a QCL-typeD relationship, or the like. At this time, as shown in FIG. 16A, NSC #A may use a TCI state including an intermediate reference signal (e.g., TRS or CSI-RS) for the beam indication, and the UE, upon receiving this TCI state, automatically receives a PDCCH or PDSCH from NSC #A using a reception beam for the measurement reference signal based on a pre-configured QCL-typeD relationship between the intermediate reference signal and the measurement reference signal.

When the network transmits a PDCCH/PDSCH of the serving cell to the UE via a Transmit Receive Point (TRP) of the non-serving cell, the following QCL indications may be considered:

Alt.4 SSB/CSI-RS/PRS (NSC)→TRS/CSI-RS (NSC) →PDCCH DMRS/PDSCH DMRS (SC);

Alt.5 SSB/CSI-RS/PRS (NSC)→TRS/CSI-RS (SC) →PDCCH DMRS/PDSCH DMRS (SC)

Figure 16B:
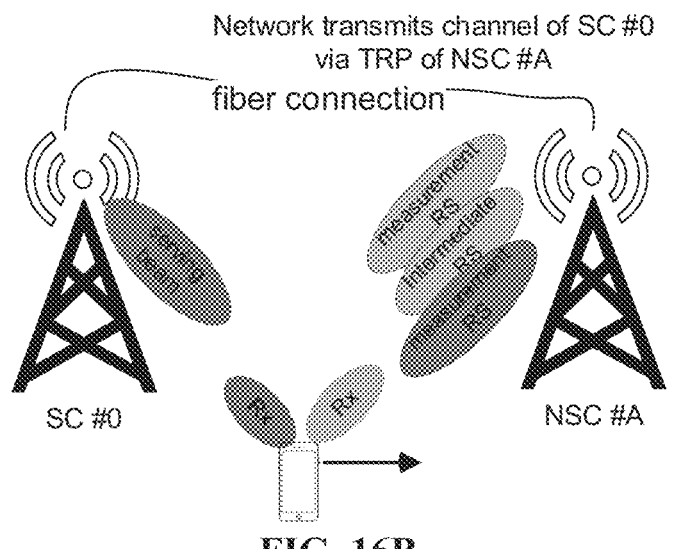
Figure 16C:
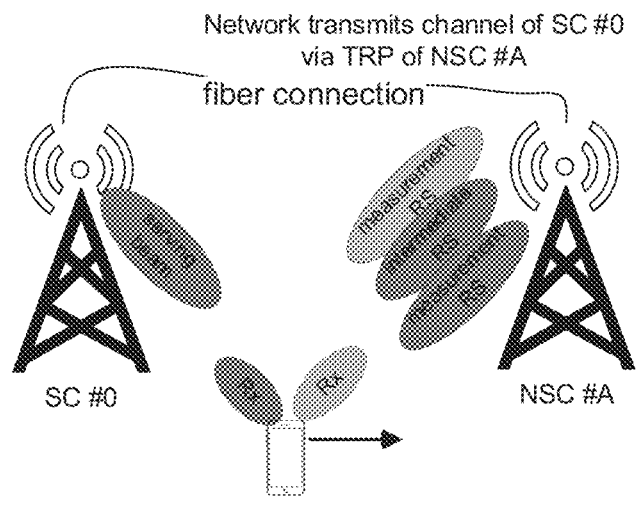

As shown in FIGS. 16B and 16C, in these cases, the target reference signal is a DMRS of PDCCH or PDSCH of the serving cell SC #0, and the intermediate reference signal may be a reference signal from SC #0 or a reference signal from NSC #A. The premise is that the UE is configured in advance with a QCL-TypeD relationship between the intermediate reference signal and the measurement reference signal.

Although the beam indication for downlink transmission is described above, the base station and the UE may use a beam for the downlink transmission to perform uplink transmission by using a symmetry between the uplink and downlink channels, that is, the UE performs uplink transmission by using a downlink reception beam, and the base station performs uplink reception by using a downlink transmission beam.

Signaling flow for the inter-cell mobility management according to the present disclosure will be briefly described below.

Figure 17:
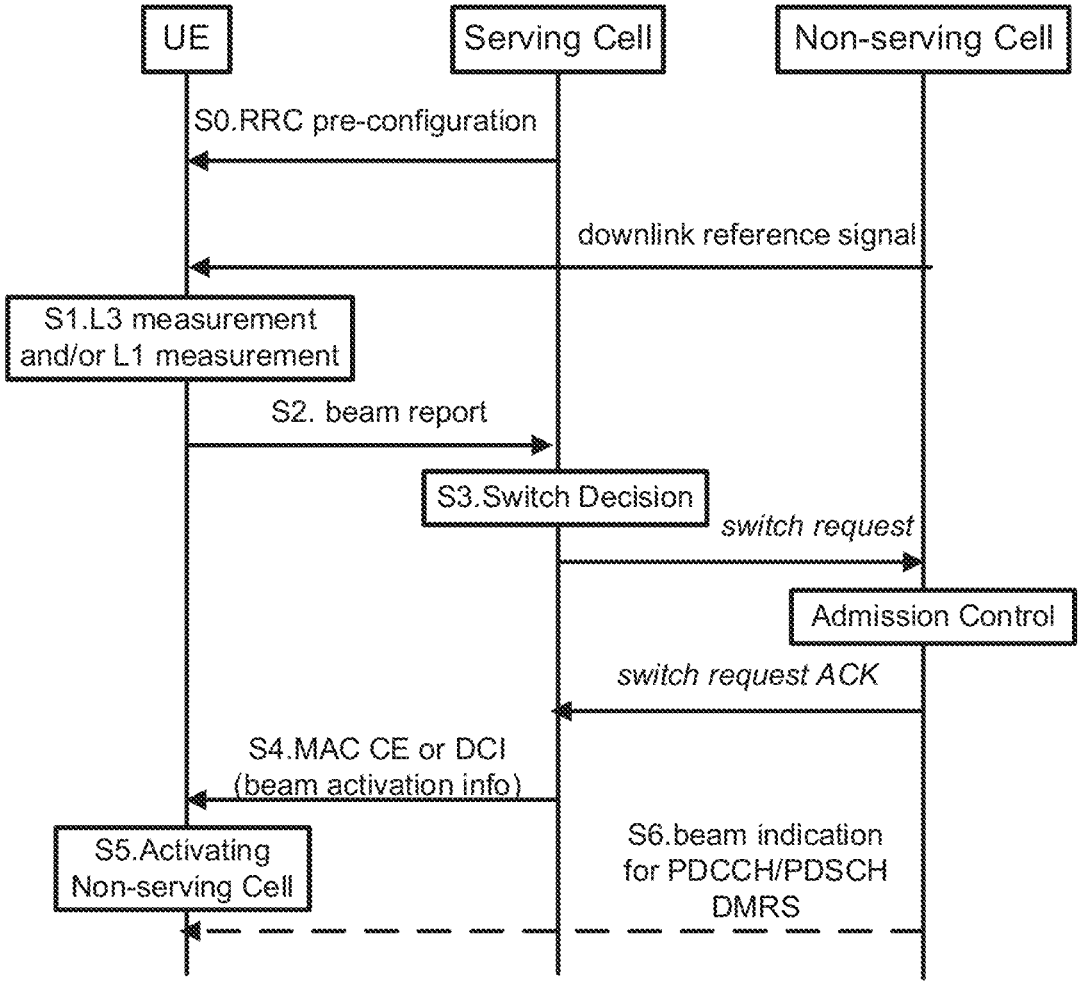
FIG. 17 illustrates an example of a signaling flow for the inter-cell mobility management.

FIG. 17 illustrates a signaling flow diagram of the inter-cell mobility management according to an embodiment. As a preparatory work, the serving cell configures the RRC parameters for the cell itself and the non-serving cells to the UE in advance (S0).

The UE may continuously measure downlink reference signals from the serving cell and the non-serving cells in accordance with a measurement period (S1), and detect whether to trigger the inter-cell mobility based on the L3 measurements and/or the L1 measurements. After a predefined measurement event occurs, the UE reports a beam report regarding one or more non-serving cells to the serving cell (S2). Alternatively, the UE may also send to the serving cell a beam report regarding the serving cell together or separately.

The serving cell makes a switch decision based at least on the beam report (S3). The serving cell transmits a switch request to a switch target cell, and a non-serving cell as the target cell performs admission control, and feeds back an ACK for the switch request to the serving cell when accepting the switch. Subsequently, the serving cell transmits activation information on a beam of the non-serving cell to the UE via MAC CE or DCI (S4).

In response to receiving the beam activation information, the UE activates the non-serving cell associated with the activated beam (S5), for example, by switching to the serving cell or adding the non-serving cell as an SCell.

Optionally, the non-serving cell may perform beam indication to the UE via MAC CE or DCI (S6) to specify a beam for the UE to receive a PDCCH or PDSCH.

Figure 18:
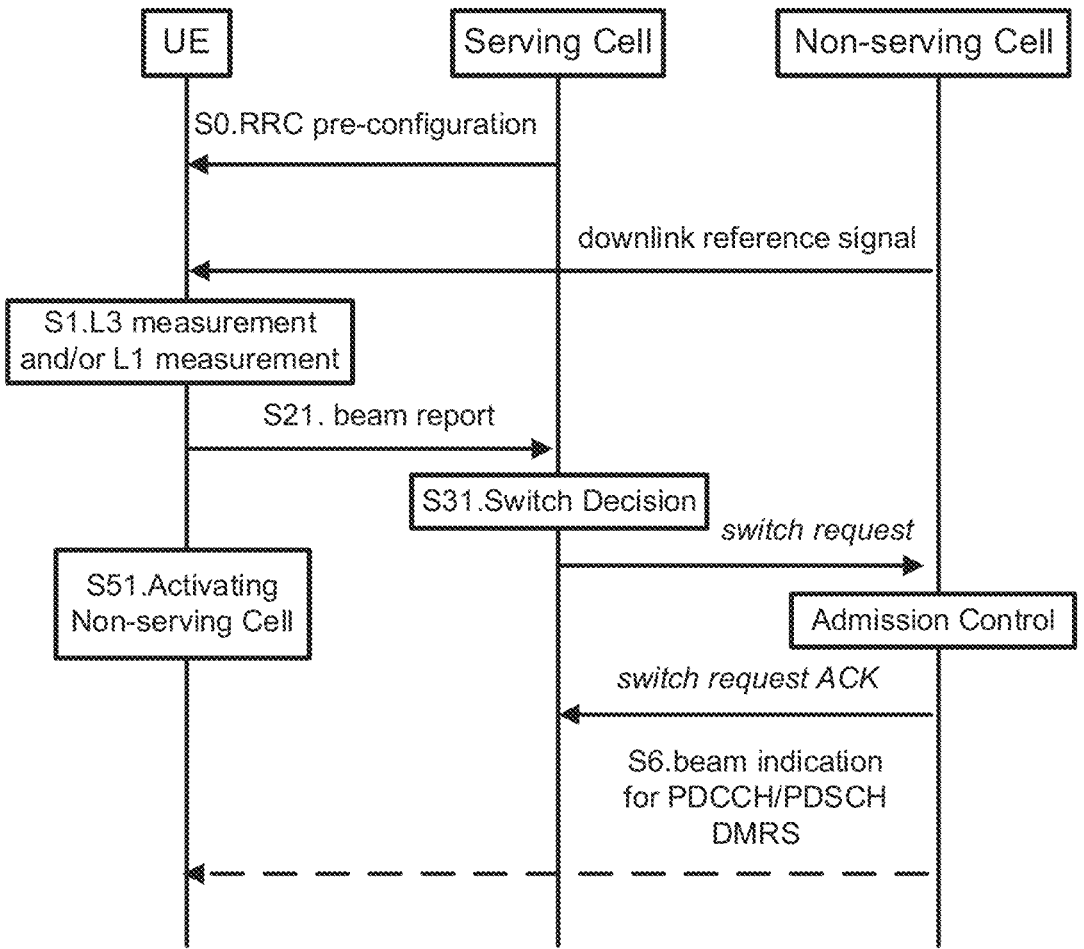
FIG. 18 illustrates another example of a signaling flow for the inter-cell mobility management.

FIG. 18 illustrates a signaling flow diagram of the inter-cell mobility management according to another embodiment. The differences of FIG. 18 from FIG. 17 will be mainly described here.

As shown in FIG. 18, when the L3 measurements and/or the L1 measurements trigger a predefined event, the UE selects a non-serving cell to be activated and sends a beam report regarding the non-serving cell to the serving cell (S21). The serving cell will only need to consider the non-serving cell reported by the UE in making a switch decision and send a switch request to it (S31).

The UE may autonomously activate the selected non-serving cell (S51) without beam activation information from the serving cell.

As described above, in the inter-cell mobility management procedure according to the present disclosure, only Layer 1 and/or layer 2 signaling is used, and participation of upper-layer signaling is minimized, so that more rapid and efficient inter-cell mobility management may be provided.

[Electronic Device and Communication Method Thereof]

Next, description is made of an electronic device and a communication method in which embodiments of the present disclosure can be implemented.

Figure 19A:
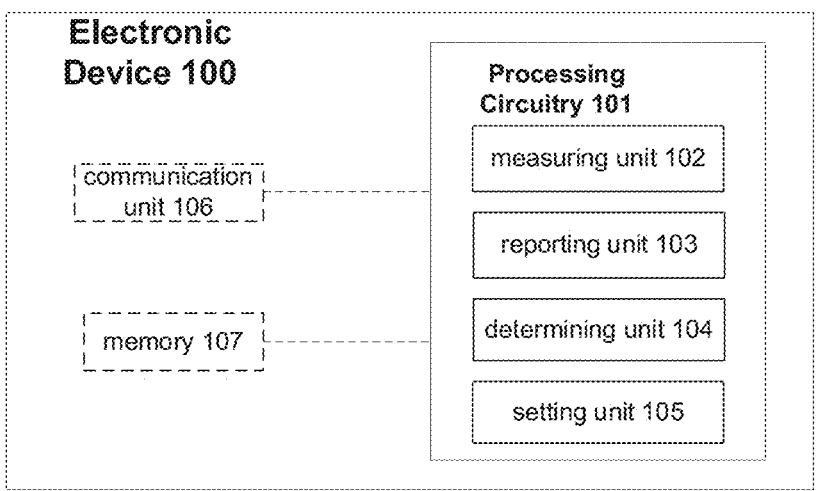
FIGS. 19A and 19B are diagrams illustrating an electronic device for UE side and a communication method thereof according to the present disclosure.

FIG. 19A is a block diagram illustrating an electronic device 100 according to the present disclosure. The electronic device 100 may be a UE or a component of a UE.

Figure 19B:
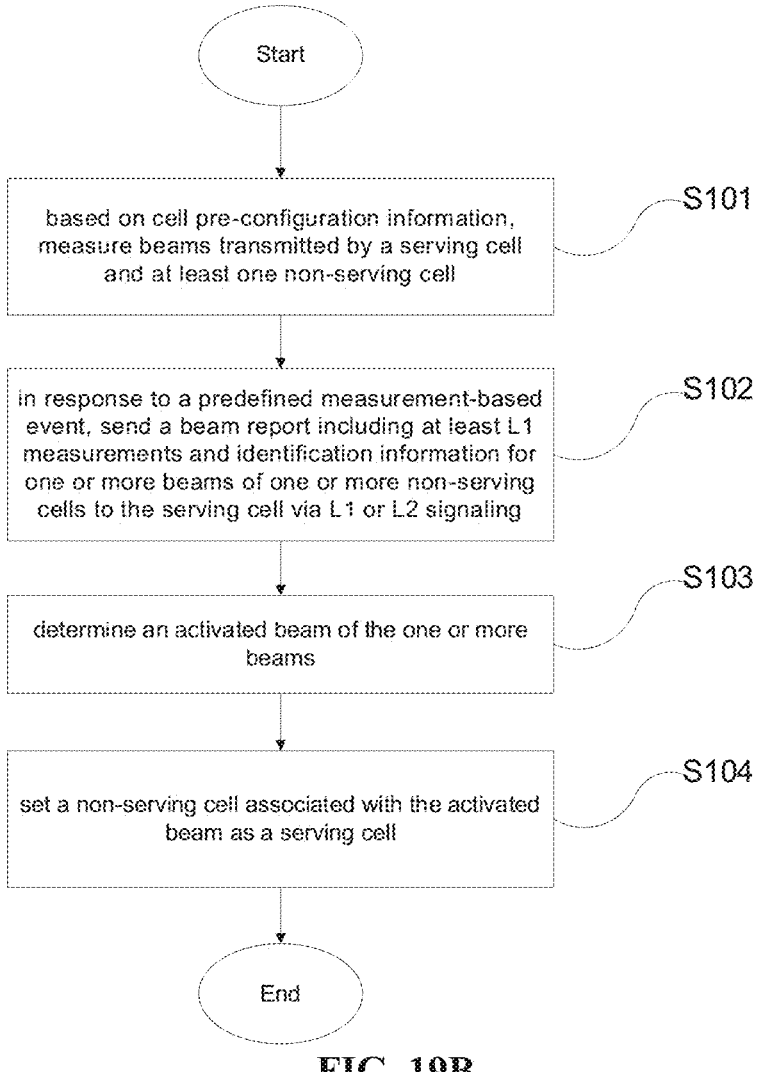

As shown in FIG. 19A, the electronic device 100 comprises a processing circuitry 101. The processing circuitry 101 includes at least a measuring unit 102, a reporting unit 103, a determining unit 104 and a setting unit 105. The processing circuitry 101 may be configured to perform a communication method as shown in FIG. 19B. The processing circuitry 101 may refer to various implementations of digital, analog, or mixed-signal (a combination of analog signal and digital signal) circuitry for performing functions in a computing system. The processing circuitry may include, for example, circuitry such as an integrated circuit (IC) or an application specific integrated circuit (ASIC), portions or circuits of an individual processor core, an entire processor core, an individual processor, a programmable hardware device such as a field programmable gate array (FPGA), and/or a system including multiple processors.

The measuring unit 102 in the processing circuitry 101 is configured to measure beams transmitted by a serving cell and at least one non-serving cell based on cell pre-configuration information, that is, to perform step S101 in FIG. 19B. The cell pre-configuration information at least includes identification information of each cell and reference signals corresponding to beams thereof. Measuring a beam includes measuring a downlink reference signal transmitted through the beam, such as SSB, CSI-RS or PRS in Layer 1, SSB or CSI-RS in Layer 3, or the like.

The reporting unit 103 is configured to send a beam report containing at least L1 measurements and identification information for one or more beams of one or more non-serving cells to the serving cell via L1 or L2 signaling in response to a predefined measurement-based event, that is, to perform step S102 in FIG. 19B.

The determining unit 104 is configured to determine an activated beam, that is, to perform step S103 in FIG. 19B. For example, the determining unit 104 may determine the activated beam based on beam activation information from the serving cell. Alternatively, in a case where the reporting unit 103 reports only the beam report for one non-serving cell, the determining unit 104 determines the beam of the non-serving cell as the activated beam.

The setting unit 105 is configured to set the non-serving cell associated with the activated beam as a serving cell, that is, to perform step S104 in FIG. 19B. The setting unit 105 may set the non-serving cell associated with the activated beam as a serving cell by switching to it or adding the non-serving cell as a secondary serving cell.

The electronic device 100 may also include a memory 106 and a memory 107.

The communication unit 106 can be configured to communicate with a cell under control of the processing circuitry 101. In one example, the communication unit 106 can be implemented as a transmitter or transceiver including communication components such as an antenna array and/or a radio frequency link. The communication unit 106 is depicted with a dashed line since it may also be located externally to the electronic device 100. The communication unit 106 may receive the cell pre-configuration information, the beam activation information and the like from the serving cell. The communication unit 106 may also transmit the beam report generated by the reporting unit 103.

The electronic device 100 may also include a memory 107. The memory 107 may store various data and instructions, such as programs and data for operation of the electronic device 100, various data generated by the processing circuitry 101, data to be transmitted by the communication unit 106 and the like. The memory 107 is depicted with a dashed line because it may also be located within the processing circuitry 101 or outside the electronic device 100. For example, the memory 107 may include, but is not limited to, Random Access Memory (RAM), Dynamic Random Access Memory (DRAM), Static Random Access Memory (SRAM), Read Only Memory (ROM), or flash memory.

Figure 20A:
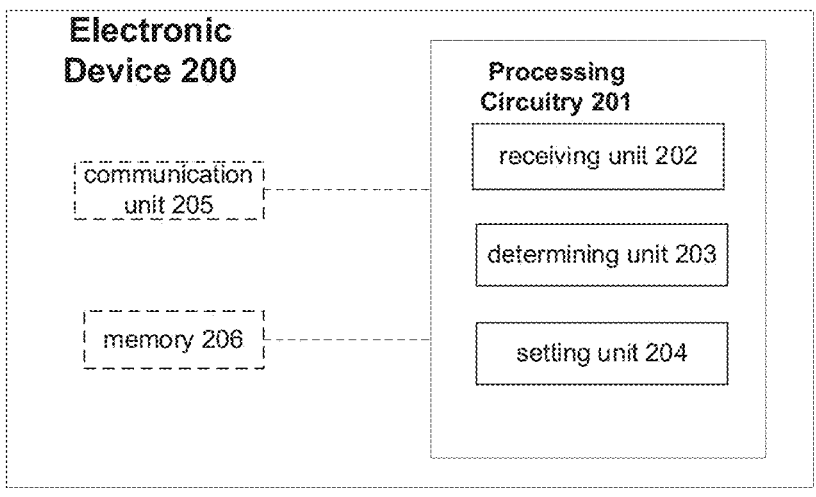
FIGS. 20A and 20B are diagrams illustrating an electronic device for network control side and a communication method thereof according to the present disclosure.

FIG. 20A is a block diagram illustrating an electronic device 200 according to the present disclosure. The electronic device 200 may be a base station or a component of a base station.

Figure 20B:
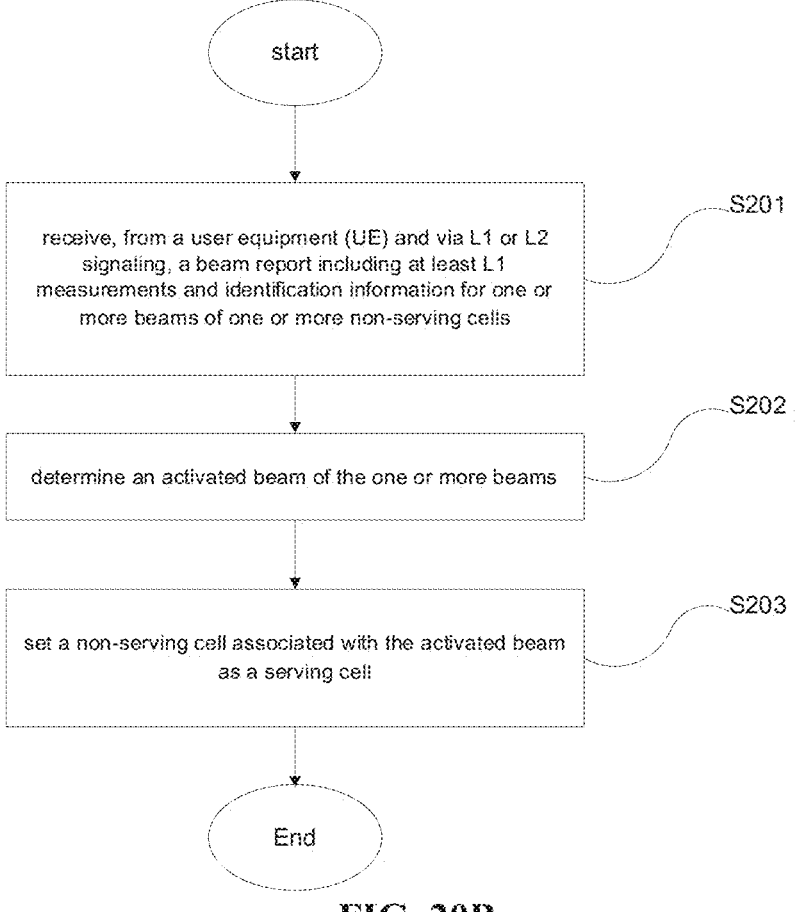

As shown in FIG. 20A, the electronic device 200 comprises a processing circuitry 201. The processing circuitry 201 includes at least a receiving unit 202, a determining unit 203 and a setting unit 204. The processing circuitry 201 may be configured to perform a communication method as shown in FIG. 20B. The processing circuitry 201 may refer to various implementations of digital, analog, or mixed-signal (a combination of analog signal and digital signal) circuitry for performing functions in a computing system. The processing circuitry may include, for example, circuitry such as an integrated circuit (IC) or an application specific integrated circuit (ASIC), portions or circuits of an individual processor core, an entire processor core, an individual processor, a programmable hardware device such as a field programmable gate array (FPGA), and/or a system including multiple processors.

The receiving unit 202 of the processing circuitry 201 is configured to receive a beam report regarding one or more non-serving cells from a user equipment (UE) via L1 or L2 uplink signaling, that is, to perform step S201 in FIG. 20B. The received beam report contains at least L1 measurements and identification information for one or more beams of one or more non-serving cells.

The determining unit 203 is configured to determine an activated beam of the one or more beams, that is, to perform step S202 in FIG. 20B. The determining unit 203 may determine the activated beam based at least on the L1 measurements in the beam report. When the beam report contains only beams of one non-serving cell, the determining unit 203 determines that a beam of the non-serving cell is to be activated.

The setting unit 204 is configured to set the non-serving cell associated with the activated beam as a serving cell, that is, to perform step S203 in FIG. 20B. The setting unit 204 may send a switch request to the activated non-serving cell to enable the UE to switch to the non-serving cell. Alternatively, the setting unit 204 may add the activated non-serving cell as a secondary serving cell in response to a recommendation from the UE.

The electronic device 200 may also include a memory 205 and a memory 206.

The communication unit 205 can be configured to communicate with the UE under control of the processing circuitry 201. In one example, the communication unit 205 can be implemented as a transmitter or transceiver including communication components such as an antenna array and/or a radio frequency link. The communication unit 205 is depicted with a dashed line since it may also be located externally to the electronic device 200. The communication unit 205 may transmit the beam activation information and the like to the UE. The communication unit 205 may also receive the beam report from the UE, or the like.

The electronic device 200 may also include a memory 206. The memory 206 may store various data and instructions, such as programs and data for operation of the electronic device 200, various data generated by the processing circuitry 201, data to be transmitted by the communication unit 205 and the like. The memory 206 is depicted with a dashed line because it may also be located within the processing circuitry 201 or outside the electronic device 200. For example, the memory 206 may include, but is not limited to, Random Access Memory (RAM), Dynamic Random Access Memory (DRAM), Static Random Access Memory (SRAM), Read Only Memory (ROM), or flash memory.

Various aspects of the embodiments of the present disclosure have been described in detail above, but it will be appreciated that the structure, arrangement, type, number and the like of antenna arrays, ports, reference signals, communication devices, communication methods and the like are illustrated for purpose of description, and are not intended to limit the aspects of the present disclosure to these specific examples.

It should be understood that the units of the electronic devices 100 and 200 described in the above embodiments are only logical modules divided according to the specific functions they implement, and are not used to limit specific implementations. In an actual implementation, the foregoing units may be implemented as individual physical entities, or may also be implemented by a single entity (for example, a processor (CPU or DSP, etc.), an integrated circuit, etc.).

Exemplary Implementations of the Present Disclosure

According to the embodiments of the present disclosure, various implementations for practicing concepts of the present disclosure can be conceived, including but not limited to:

1). An electronic device on user side, comprising:
a processing circuitry configured to
 based on cell pre-configuration information, measure beams transmitted by a serving cell and at least one non-serving cell;
 in response to a predefined measurement-based event, send a beam report including at least L1 measurements and identification information for one or more beams of one or more non-serving cells to the serving cell via L1 or L2 signaling;
 determine an activated beam of the one or more beams; and
 set a non-serving cell associated with the activated beam as a serving cell.

2). The electronic device according to 1), wherein the cell pre-configuration information includes at least identification information for each of the cells and reference signals corresponding to its beams.

3). The electronic device according to 1), wherein the cell pre-configuration information includes common configuration parameters for all of the cells and configuration parameters specific to each of the cells.

4). The electronic device according to 1), wherein in a case where the beams transmit reference signals in L1, the predefined measurement-based event includes at least one of:

L1 measurement of a reference signal of the serving cell being worse than an absolute threshold;
 L1 measurement of a reference signal of a non-serving cell being better than L1 measurement of a reference signal of the serving cell by an amount of offset;
 L1 measurement of a reference signal of a non-serving cell being better than an absolute threshold;
 L1 measurement of a reference signal of the serving cell being worse than an absolute threshold and L1 measurement of a reference signal of a non-serving cell being better than another absolute threshold;
in a case where the beams transmit reference signals in L3, the predefined measurement-based event includes at least one of:
 L3 measurement of a reference signal of the serving cell being worse than an absolute threshold;
 L3 measurement of a reference signal of a non-serving cell being better than L3 measurement of a reference signal of the serving cell by an amount of offset; L3 measurement of a reference signal of a non-serving cell being better than an absolute threshold;
 L3 measurement of a reference signal of the serving cell being worse than an absolute threshold and L3 measurement of a reference signal of a non-serving cell being better than another absolute threshold.

5). The electronic device according to 1), wherein the L1 or L2 signaling includes UCI or MAC CE.

6). The electronic device according to 1), wherein the beam report further includes at least one of:
an identifier of the at least one non-serving cell;
a type of the predefined measurement-based event.

7). The electronic device according to 1), wherein the identification information for each of the one or more beams includes an index of a reference signal corresponding to the beam or a TCI state referencing a reference signal corresponding to the beam.

8). The electronic device according to 1), wherein in response to the predefined measurement-based event, the UE triggers the sending of the beam report, and sends the beam report on available transmission resource or requests from the serving cell transmission resources for sending the beam report.

9). The electronic device according to 1), wherein the processing circuitry is further configured to:
receive, from the serving cell and via L1 or L2 signaling, beam activation information indicating a beam of a non-serving cell that the serving cell decides to activate based on the beam report; and
determine the activated beam based on the beam activation information.

10). The electronic device according to 1), wherein the processing circuitry is further configured to
in response to the predefined measurement-based event, select one non-serving cell having the best L1 measurement, and sends a beam report regarding the non-serving cell to the serving cell;
determine an activated beam of the non-serving cell; and
set the non-serving cell as a serving cell.

11). The electronic device according to 1), wherein setting a non-service cell associated with the activated beam as a service cell comprising:
switching from the current service cell to the non-serving cell associated with the activated beam; or
adding the non-serving cell associated with the activated beam as a secondary service cell.

12). The electronic device according to 1), wherein the processing circuitry is further configured to:

receive, via L1 or L2 signaling and from the non-serving cell associated with the activated beam, beam indication information for PDCCH or PDSCH, which indicates that the activated beam is to be used for reception of subsequent PDCCH or PDSCH.

13). The electronic device according to 12), wherein the processing circuitry is configured to:

before a successful transmission is confirmed, repeat the sending of the beam report until a predetermined maximum number of transmissions.

14). An electronic device on control side, comprising:

a processing circuitry is configured to receive, from a user equipment (UE) and via L1 or L2 signaling, a beam report including at least L1 measurements and identification information for one or more beams of one or more non-serving cells;

determine an activated beam of the one or more beams; and set a non-serving cell associated with the activated beam as a serving cell.

15). The electronic device according to 14), wherein the processing circuitry is further configured to:

determine the activated beam from the one or more beams based on the beam report; and send, to the UE and via L1 and L2 signaling, beam activation information which indicates the activated beam.

16). The electronic device according to 14), wherein the processing circuitry is further configured to:

send a switch request to the non-service cell associated with the activated beam.

17). The electronic device according to 14), wherein the processing circuitry is further configured to:

send cell pre-configuration information to the UE, such that the UE can measure beams transmitted by the serving cell and at least one non-serving cell based on the cell pre-configuration information.

18). A communication method comprising:

based on cell pre-configuration information, measuring beams transmitted by a serving cell and at least one non-serving cell;

in response to a predefined measurement-based event, sending a beam report including at least L1 measurements and identification information for one or more beams of one or more non-serving cells to the serving cell via L1 or L2 signaling;

determining an activated beam of the one or more beams; and setting a non-serving cell associated with the activated beam as a serving cell.

19). A communication method comprising:

receiving, from a user equipment (UE) and via L1 or L2 signaling, a beam report including at least L1 measurements and identification information for one or more beams of one or more non-serving cells;

determining an activated beam of the one or more beams; and setting a non-serving cell associated with the activated beam as a serving cell.

20). A non-transitory computer readable storage medium storing executable instructions which, when executed, perform the communication method according to 18) or 19).

Application Examples of the Present Disclosure

The technology of the present disclosure can be applied to various products.

For example, the electronic device 200 according to the embodiments of the present disclosure can be implemented as a variety of base stations or included in a variety of base stations, and the electronic device 100 can be implemented as a variety of user devices or included in a variety of user devices.

The communication methods according to the embodiments of the present disclosure may be implemented by various base stations or user devices; the methods and operations according to the embodiments of the present disclosure may be embodied as computer-executable instructions, stored in a non-transitory computer-readable storage medium, and can be performed by various base stations or user devices to implement one or more of the above-mentioned functions.

The technology according to the embodiments of the present disclosure can be made into various computer program products, which can be used in various base stations or user devices to implement one or more of the above-mentioned functions.

The base stations mentioned in the present disclosure can be implemented as any type of base stations, preferably, such as the macro gNB or ng-eNB defined in the 3GPP 5G NR standard. A gNB may be a gNB that covers a cell smaller than a macro cell, such as a pico gNB, a micro gNB, and a home (femto) gNB. Instead, the base station may be implemented as any other types of base stations such as a NodeB, an eNodeB and a base transceiver station (BTS). The base station may include a main body configured to control wireless communication, and one or more remote radio heads (RRH), a wireless relay, a drone control tower, a control node in an automated factory or the like disposed in a different place from the main body.

The user device may be implemented as a mobile terminal such as a smartphone, a tablet personal computer (PC), a notebook PC, a portable game terminal, a portable/dongle type mobile router, and a digital camera apparatus, or an in-vehicle terminal such as a car navigation device. The terminal device may also be implemented as a terminal (that is also referred to as a machine type communication (MTC) terminal) that performs machine-to-machine (M2M) communication, a drone, a sensor or actuator in an automated factory or the like. Furthermore, the terminal device may be a wireless communication module (such as an integrated circuit module including a single die) mounted on each of the above terminals.

Examples of the base station and the user device in which the present disclosure can be applied will be described briefly below.

It should be understood that the term "base station" in the present disclosure has the full breadth of its usual meaning and includes at least a wireless communication station that is used as part of a wireless communication system or radio system for facilitating communication. Examples of base stations may be, for example but not limited to, the following: one or both of a base transceiver station (BTS) and a base station controller (BSC) in a GSM system, one or both of a radio network controller (RNC) and Node B in a 3G communication system, an eNB in an LTE and LTE-Advanced system, or a gNB and ng-eNB in the 5G communication system. In D2D, M2M, and V2V communication scenarios, a logical entity with control function for communication may also be referred to as a base station. In cognitive radio communication scenarios, a logical entity that plays a spectrum coordination role may also be referred to as a base station. In an automated factory, a logical entity providing the network control function may be referred to as a base station.

First Application Example of Base Station

Figure 21:
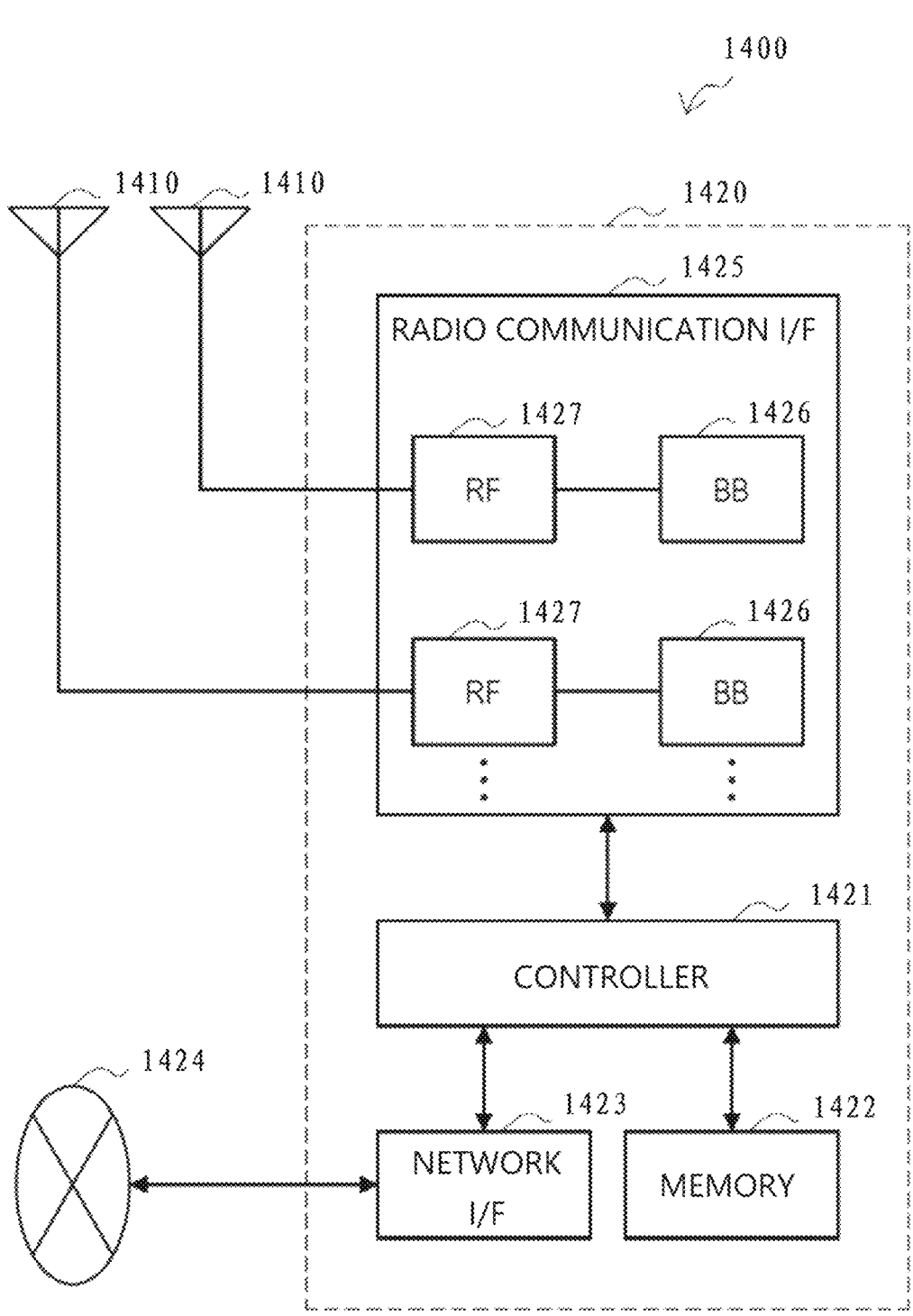
FIG. 21 illustrates a first example of schematic configuration of the base station according to the present disclosure.

FIG. 21 is a block diagram showing a first example of a schematic configuration of a base station to which the technology of the present disclosure can be applied. In FIG. 21, the base station is implemented as gNB 1400. The gNB 1400 includes a plurality of antennas 1410 and a base station device 1420. The base station device 1420 and each antenna 1410 may be connected to each other via an RF cable. In an implementation manner, the gNB 1400 (or the base station device 1420) herein may correspond to any of the above-mentioned electronic device 200.

The antennas 1410 includes multiple antenna elements, such as multiple antenna arrays for large-scale MIMO. The antennas 1410, for example, can be arranged into a matrix of antenna arrays, and are used by the base station device 1420 to transmit and receive wireless signals. For example, multiple antennas 1410 may be compatible with multiple frequency bands used by gNB 1400.

The base station device 1420 includes a controller 1421, a memory 1422, a network interface 1423, and a radio communication interface 1425.

The controller 1421 may be, for example, a CPU or a DSP, and operates various functions of the base station device 1420 at a higher layer. For example, the controller 1421 may include any of the processing circuitry 201 as described above, perform the communication method described in FIG. 20B, or control various components of the electronic device 200. For example, the controller 1421 generates data packets based on data in signals processed by the radio communication interface 1425, and passes the generated packets via the network interface 1423. The controller 1421 may bundle data from multiple baseband processors to generate bundled packets, and pass the generated bundled packets. The controller 1421 may have logical functions that perform controls such as radio resource control, radio bearer control, mobility management, admission control, and scheduling. The controls can be performed in conjunction with a nearby gNB or core network node. The memory 1422 includes a RAM and a ROM, and stores a program executed by the controller 1421 and various types of control data such as a terminal list, transmission power data, and scheduling data.

The network interface 1423 is a communication interface for connecting the base station device 1420 to the core network 1424. The controller 1421 may communicate with a core network node or another gNB via the network interface 1423. In this case, the gNB 1400 and the core network node or other gNBs may be connected to each other through a logical interface such as an S1 interface and an X2 interface. The network interface 1423 may also be a wired communication interface or a radio communication interface for a wireless backhaul line. If the network interface 1423 is a radio communication interface, compared with the frequency band used by the radio communication interface 1425, the network interface 1423 can use a higher frequency band for wireless communication.

The radio communication interface 1425 supports any cellular communication scheme such as 5G NR, and provides a wireless connection to a terminal located in a cell of the gNB 1400 via an antenna 1410. The radio communication interface 1425 may generally include, for example, a baseband (BB) processor 1426 and an RF circuit 1427. The BB processor 1426 may perform, for example, encoding/decoding, modulation/demodulation, and multiplexing/demultiplexing, and execute various types of signal processing in layers such as the physical layer, the MAC layer, the RLC layer, and the PDCP layer. As an alternative of the controller 1421, the BB processor 1426 may have a part or all of the above-mentioned logical functions. The BB processor 1426 may be a memory storing a communication control program, or a module including a processor and related circuits configured to execute the program. Updating the program can change the function of the BB processor 1426. The module may be a card or a blade inserted into a slot of the base station device 1420. Alternatively, the module may be a chip mounted on a card or a blade. Meanwhile, the RF circuit 1427 may include, for example, a mixer, a filter, and an amplifier, and transmits and receives a wireless signal via the antenna 1410. Although FIG. 21 illustrates an example in which one RF circuit 1427 is connected to one antenna 1410, the present disclosure is not limited to this illustration, but one RF circuit 1427 may be connected to multiple antennas 1410 at the same time.

As shown in FIG. 21, the radio communication interface 1425 may include a plurality of BB processors 1426. For example, the plurality of BB processors 1426 may be compatible with multiple frequency bands used by gNB 1400. As shown in FIG. 21, the radio communication interface 1425 may include a plurality of RF circuits 1427. For example, the plurality of RF circuits 1427 may be compatible with multiple antenna elements. Although FIG. 21 shows an example in which the radio communication interface 1425 includes a plurality of BB processors 1426 and a plurality of RF circuits 1427, the radio communication interface 1425 may also include a single BB processor 1426 or a single RF circuit 1427.

In the gNB 1400 illustrated in FIG. 21, one or more of the units included in the processing circuitry 201 (for example, the receiving unit 202) may be implemented in the radio communication interface 1425. Alternatively, at least a part of these components may be implemented in the controller 1421. As an example, the gNB 1400 includes a part (for example, the BB processor 1426) or the entire of the radio communication interface 1425 and/or a module including the controller 1421, and the one or more components may be implemented in the module. In this case, the module may store a program (in other words, a program causing the processor to execute operations of the one or more components) causing the processor to function as the one or more components, and execute the program. As another example, a program causing the processor to function as the one or more components may be installed in the gNB 1400, and the radio communication interface 1425 (for example, the BB processor 1426) and/or the controller 1421 may execute the program. As described above, as a device including the one or more components, the gNB 1400, the base station device 1420 or the module may be provided. In addition, a readable medium in which the program is recorded may be provided.

Second Application Example of Base Station

Figure 22:
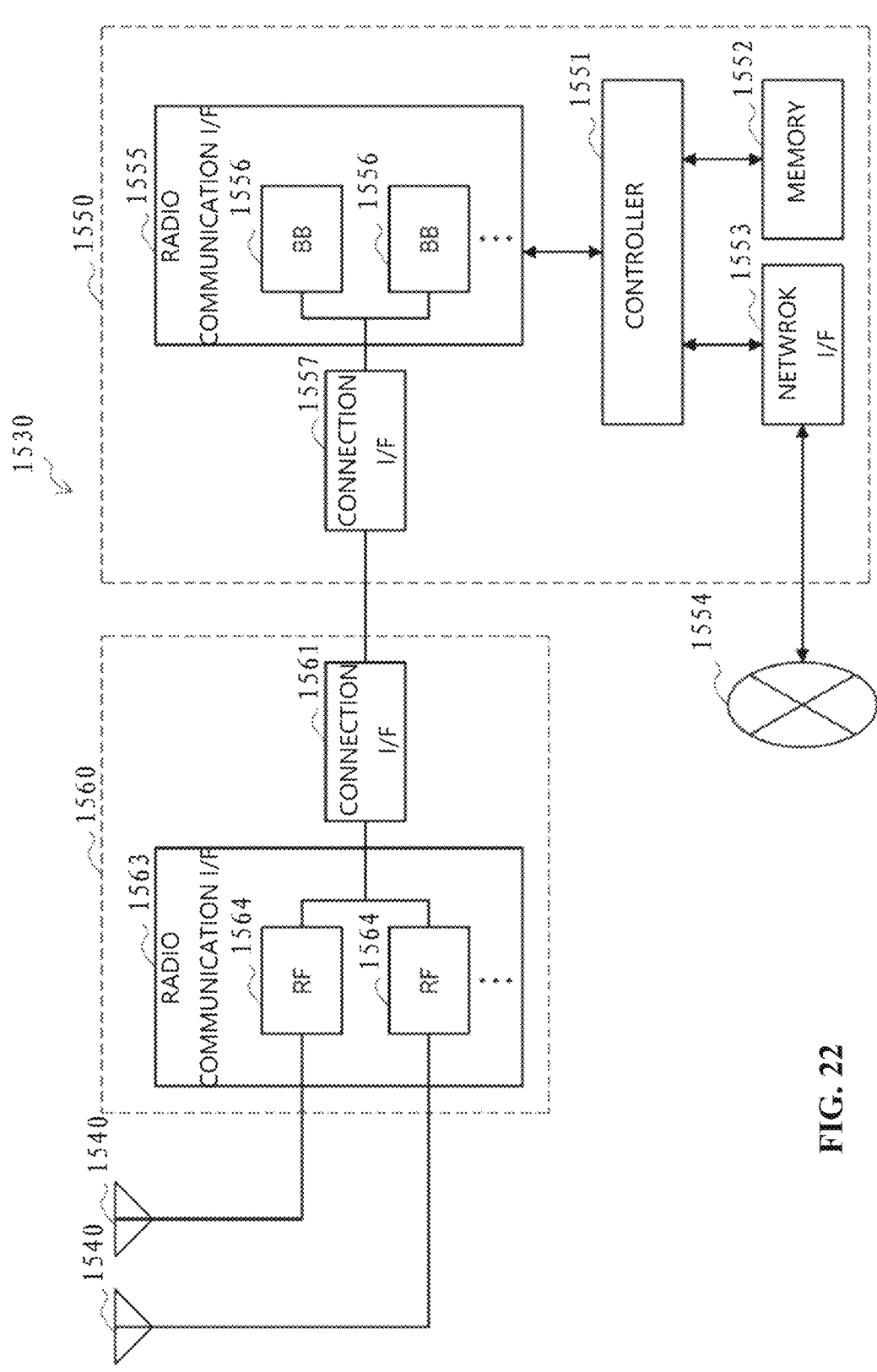
FIG. 22 illustrates a second example of schematic configuration of the base station according to the present disclosure.

FIG. 22 is a block diagram showing a second example of a schematic configuration of a base station to which the technology of the present disclosure can be applied. In FIG. 22, the base station is shown as gNB 1530. The gNB 1530 includes multiple antennas 1540, base station equipment 1550, and RRH 1560. The RRH 1560 and each antenna 1540 may be connected to each other via an RF cable. The base station equipment 1550 and the RRH 1560 may be connected to each other via a high-speed line such as a fiber optic cable. In an implementation manner, the gNB 1530 (or the base station device 1550) herein may correspond to any of the above-mentioned electronic device 200.

The antennas 1540 includes multiple antenna elements, such as multiple antenna arrays for large-scale MIMO. The antennas 1540, for example, can be arranged into a matrix of antenna arrays, and are used by the base station device 1550 to transmit and receive wireless signals. For example, multiple antennas 1540 may be compatible with multiple frequency bands used by gNB 1530.

The base station device 1550 includes a controller 1551, a memory 1552, a network interface 1553, a radio communication interface 1555, and a connection interface 1557. The controller 1551, the memory 1552, and the network interface 1553 are the same as the controller 1421, the memory 1422, and the network interface 1423 described with reference to FIG. 21.

The radio communication interface 1555 supports any cellular communication scheme such as 5G NR, and provides wireless communication to a terminal located in a sector corresponding to the RRH 1560 via the RRH 1560 and the antenna 1540. The radio communication interface 1555 may typically include, for example, a BB processor 1556. The BB processor 1556 is the same as the BB processor 1426 described with reference to FIG. 21 except that the BB processor 1556 is connected to the RF circuit 1564 of the RRH 1560 via the connection interface 1557. As shown in FIG. 22, the radio communication interface 1555 may include a plurality of BB processors 1556. For example, multiple BB processors 1556 may be compatible with multiple frequency bands used by gNB 1530. Although FIG. 22 shows an example in which the radio communication interface 1555 includes a plurality of BB processors 1556, the radio communication interface 1555 may also include a single BB processor 1556.

The connection interface 1557 is an interface for connecting the base station device 1550 (radio communication interface 1555) to the RRH 1560. The connection interface 1557 may also be a communication module for communication in the above-mentioned high-speed line connecting the base station device 1550 (radio communication interface 1555) to the RRH 1560.

The RRH 1560 includes a connection interface 1561 and a radio communication interface 1563.

The connection interface 1561 is an interface for connecting the RRH 1560 (radio communication interface 1563) to the base station device 1550. The connection interface 1561 may also be a communication module for communication in the above-mentioned high-speed line.

The radio communication interface 1563 transmits and receives wireless signals via the antenna 1540. The radio communication interface 1563 may generally include, for example, an RF circuit 1564. The RF circuit 1564 may include, for example, a mixer, a filter, and an amplifier, and transmits and receives wireless signals via the antenna 1540. Although FIG. 22 illustrates an example in which one RF circuit 1564 is connected to one antenna 1540, the present disclosure is not limited to this illustration, but one RF circuit 1564 may be connected to multiple antennas 1540 at the same time.

As shown in FIG. 22, the radio communication interface 1563 may include a plurality of RF circuits 1564. For example, the plurality of RF circuits 1564 may support multiple antenna elements. Although FIG. 22 shows an example in which the radio communication interface 1563 includes a plurality of RF circuits 1564, the radio communication interface 1563 may include a single RF circuit 1564.

In the gNB 1500 shown in FIG. 22, one or more units included in the processing circuitry 201 (for example, the receiving unit 202) may be implemented in the radio communication interface 1525. Alternatively, at least a part of these components may be implemented in the controller 1521. For example, the gNB 1500 includes a part (for example, the BB processor 1526) or the whole of the radio communication interface 1525, and/or a module including the controller 1521, and one or more components may be implemented in the module. In this case, the module may store a program for allowing the processor to function as one or more components (in other words, a program for allowing the processor to perform operations of one or more components), and may execute the program. As another example, a program for allowing the processor to function as one or more components may be installed in the gNB 1500, and the radio communication interface 1525 (for example, the BB processor 1526) and/or the controller 1521 may execute the program. As described above, as a device including one or more components, the gNB 1500, the base station device 1520, or a module may be provided, and a program for allowing the processor to function as one or more components may be provided. In addition, a readable medium in which the program is recorded may be provided.

First Application Example of User Device

Figure 23:
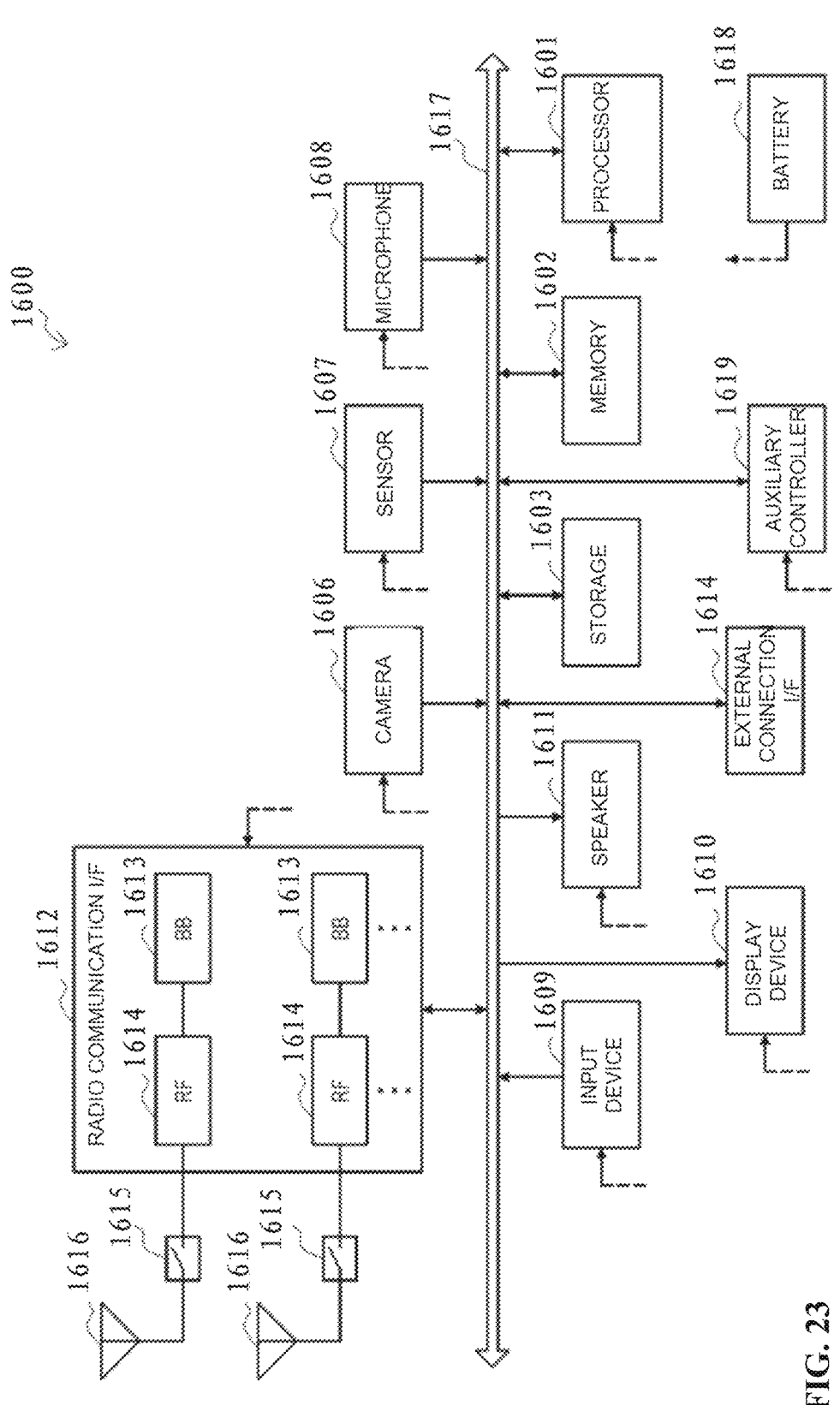
FIG. 23 illustrates an example of schematic configuration of a smart phone according to the present disclosure.

FIG. 23 is a block diagram showing an example of a schematic configuration of a smartphone 1600 to which the technology of the present disclosure can be applied. In an example, the smart phone 1600 may be implemented as any of the electronic device 100 described with reference to FIG. 19A.

The smartphone 1600 includes a processor 1601, a memory 1602, a storage device 1603, an external connection interface 1604, a camera device 1606, a sensor 1607, a microphone 1608, an input device 1609, a display device 1610, a speaker 1611, a radio communication interface 1612, one or more antenna switches 1615, one or more antennas 1616, a bus 1617, a battery 1618, and an auxiliary controller 1619.

The processor 1601 may be, for example, a CPU or a system on chip (SoC), and controls functions of an application layer and another layer of the smartphone 1600. The processor 1601 may include or serve as any of the processing circuitry 101 described with reference to FIG. 19A. The memory 1602 includes a RAM and a ROM, and stores data and programs executed by the processor 1601. The storage device 1603 may include a storage medium such as a semiconductor memory and a hard disk. The external connection interface 1604 is an interface for connecting external devices such as a memory card and a universal serial bus (USB) device to the smartphone 1600.

The camera device 1606 includes an image sensor such as a charge-coupled device (CCD) and a complementary metal oxide semiconductor (CMOS), and generates a captured image. The sensor 1607 may include a set of sensors such as a measurement sensor, a gyroscope sensor, a geomagnetic sensor, and an acceleration sensor. The microphone 1608 converts a sound input to the smartphone 1600 into an audio signal. The input device 1609 includes, for example, a touch sensor, a keypad, a keyboard, a button, or a switch configured to detect a touch on the screen of the display device 1610, and receives an operation or information input from a user. The display device 1610 includes a screen such as a liquid crystal display (LCD) and an organic light emitting diode (OLED) display, and displays an output image of the smartphone 1600. The speaker 1611 converts an audio signal output from the smartphone 1600 into a sound.

The radio communication interface 1612 supports any cellular communication scheme such as 4G LTE, 5G NR or the like, and performs wireless communication. The radio communication interface 1612 may generally include, for example, a BB processor 1613 and an RF circuit 1614. The BB processor 1613 may perform, for example, encoding/decoding, modulation/demodulation, and multiplexing/demultiplexing, and perform various types of signal processing for wireless communication. Meanwhile, the RF circuit 1614 may include, for example, a mixer, a filter, and an amplifier, and transmits and receives wireless signals via the antenna 1616. The radio communication interface 1612 may be a chip module on which a BB processor 1613 and an RF circuit 1614 are integrated. As shown in FIG. 23, the radio communication interface 1612 may include multiple BB processors 1613 and multiple RF circuits 1614. Although FIG. 23 illustrates an example in which the radio communication interface 1612 includes a plurality of BB processors 1613 and a plurality of RF circuits 1614, the radio communication interface 1612 may also include a single BB processor 1613 or a single RF circuit 1614.

In addition, in addition to the cellular communication scheme, the radio communication interface 1612 may support other types of wireless communication scheme, such as a short-range wireless communication scheme, a near field communication scheme, and a wireless local area network (LAN) scheme. In this case, the radio communication interface 1612 may include a BB processor 1613 and an RF circuit 1614 for each wireless communication scheme.

Each of the antenna switches 1615 switches a connection destination of the antenna 1616 between a plurality of circuits included in the radio communication interface 1612 (for example, circuits for different wireless communication schemes).

The antennas 1616 includes multiple antenna elements, such as multiple antenna arrays for large-scale MIMO. The antennas 1616, for example, can be arranged into a matrix of antenna arrays, and are used by the radio communication interface 1612 to transmit and receive wireless signals. The smart phone 1600 can includes one or more antenna panels (not shown).

In addition, the smartphone 1600 may include an antenna 1616 for each wireless communication scheme. In this case, the antenna switch 1615 may be omitted from the configuration of the smartphone 1600.

The bus 1617 connects the processor 1601, the memory 1602, the storage device 1603, the external connection interface 1604, the camera device 1606, the sensor 1607, the microphone 1608, the input device 1609, the display device 1610, the speaker 1611, the radio communication interface 1612, and the auxiliary controller 1619 to each other. The battery 1618 supplies power to each block of the smartphone 1600 shown in FIG. 23 via a feeder, and the feeder is partially shown as a dotted line in the figure. The auxiliary controller 1619 operates the minimum necessary functions of the smartphone 1600 in the sleep mode, for example.

Figure 24:
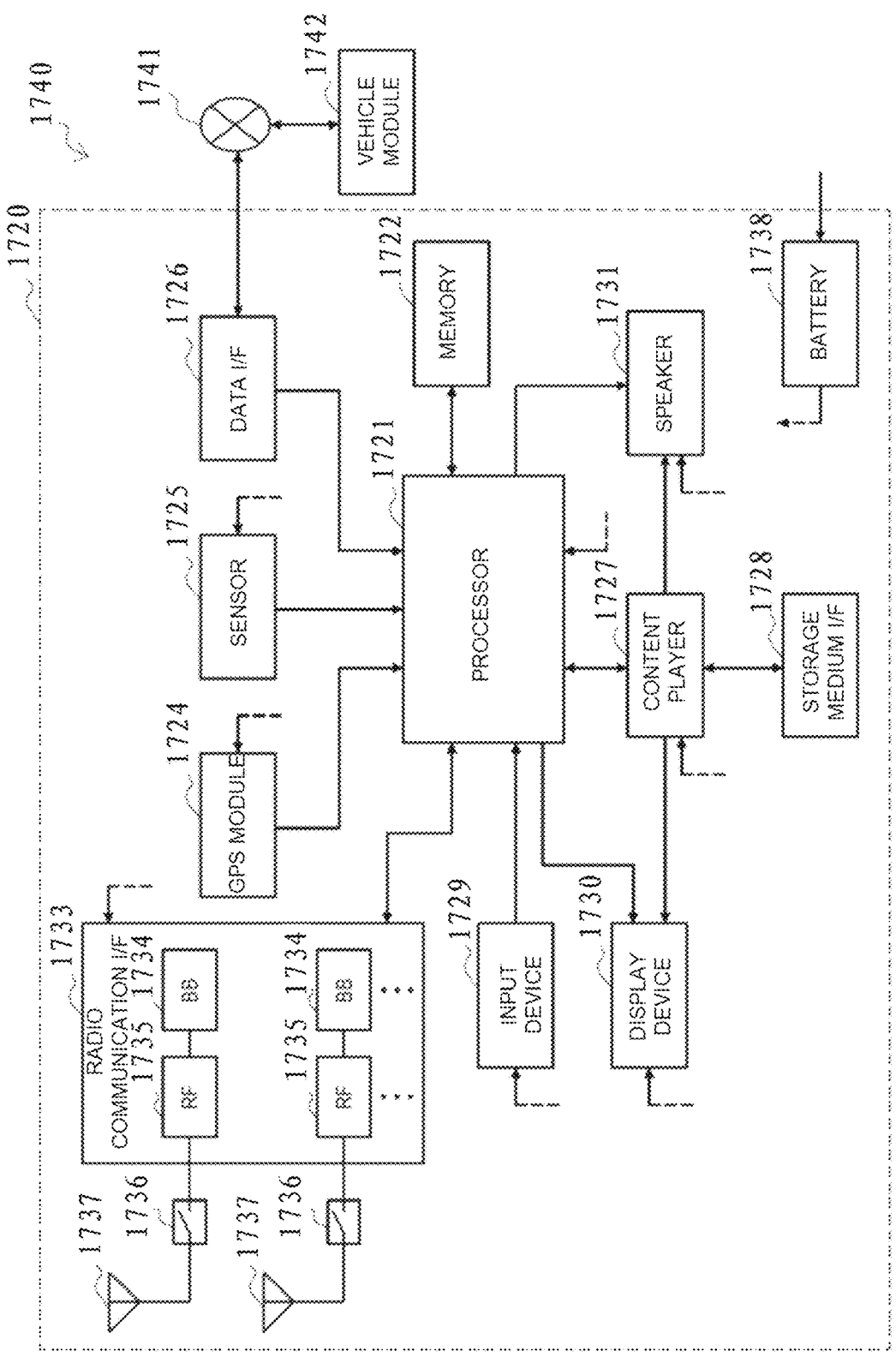
FIG. 24 illustrates an example of schematic configuration of an automobile navigation device according to the present disclosure.

In the smart phone 1600 shown in FIG. 23, one or more units included in the processing circuitry 101 (for example, the reporting unit 103) described with reference to FIG. 19A may be implemented in the radio communication interface 1612. Alternatively, at least a part of these components may be implemented in the processor 1601 or the auxiliary controller 1619. As an example, the smart phone 1600 includes a part (for example, the BB processor 1613) or the whole of the radio communication interface 1612, and/or a module including the processor 1601 and/or the auxiliary controller 1619, and one or more components may be Implemented in this module. In this case, the module may store a program that allows processing to function as one or more components (in other words, a program for allowing the processor to perform operations of one or more components), and may execute the program. As another example, a program for allowing the processor to function as one or more components may be installed in the smart phone 1600, and the radio communication interface 1612 (for example, the BB processor 1613), the processor 1601, and/or the auxiliary The controller 1619 can execute this program. As described above, as a device including one or more components, a smart phone 1600 or a module may be provided, and a program for allowing a processor to function as one or more components may be provided. In addition, a readable medium in which the program is recorded may be provided.
Second Application Example of User Device FIG. 24 is a block diagram showing an example of a schematic configuration of a car navigation device 1720 to which the technology of the present disclosure can be applied. The car navigation device 1720 can be implemented as the electronic device 100 described with reference to FIG. 19A. The car navigation device 1720 includes a processor 1721, a memory 1722, a global positioning system (GPS) module 1724, a sensor 1725, a data interface 1726, a content pLayer 1727, a storage medium interface 1728, an input device 1729, a display device 1730, a speaker 1731, and a radio communication interface 1733, one or more antenna switches 1736, one or more antennas 1737, and a battery 1738.

The processor 1721 may be, for example, a CPU or a SoC, and controls navigation functions and other functions of the car navigation device 1720. The memory 1722 includes a RAM and a ROM, and stores data and programs executed by the processor 1721.

The GPS module 1724 uses a GPS signal received from a GPS satellite to measure the position (such as latitude, longitude, and altitude) of the car navigation device 1720. The sensor 1725 may include a set of sensors such as a gyroscope sensor, a geomagnetic sensor, and an air pressure sensor. The data interface 1726 is connected to, for example, an in-vehicle network 1741 via a terminal not shown, and acquires data (such as vehicle speed data) generated by the vehicle.

The content pLayer 1727 reproduces content stored in a storage medium such as a CD and a DVD, which is inserted into the storage medium interface 1728. The input device 1729 includes, for example, a touch sensor, a button, or a switch configured to detect a touch on the screen of the display device 1730, and receives an operation or information input from a user. The display device 1730 includes a screen such as an LCD or OLED display, and displays an image of a navigation function or reproduced content. The speaker 1731 outputs the sound of the navigation function or the reproduced content.

The radio communication interface 1733 supports any cellular communication scheme such as 4G LTE or 5G NR, and performs wireless communication. The radio communication interface 1733 may generally include, for example, a BB processor 1734 and an RF circuit 1735. The BB processor 1734 may perform, for example, encoding/decoding, modulation/demodulation, and multiplexing/demultiplexing, and perform various types of signal processing for wireless communication. Meanwhile, the RF circuit 1735 may include, for example, a mixer, a filter, and an amplifier, and transmit and receive wireless signals via the antenna 1737. The radio communication interface 1733 may also be a chip module on which a BB processor 1734 and an RF circuit 1735 are integrated. As shown in FIG. 24, the radio communication interface 1733 may include a plurality of BB processors 1734 and a plurality of RF circuits 1735. Although FIG. 24 shows an example in which the radio communication interface 1733 includes a plurality of BB processors 1734 and a plurality of RF circuits 1735, the radio communication interface 1733 may also include a single BB processor 1734 or a single RF circuit 1735.

In addition, in addition to the cellular communication scheme, the radio communication interface 1733 may support other types of wireless communication scheme, such as a short-range wireless communication scheme, a near field communication scheme, and a wireless LAN scheme. In this case, the radio communication interface 1733 may include a BB processor 1734 and an RF circuit 1735 for each wireless communication scheme.

Each of the antenna switches 1736 switches the connection destination of the antenna 1737 between a plurality of circuits included in the radio communication interface 1733, such as circuits for different wireless communication schemes.

The antennas 1737 includes multiple antenna elements, such as multiple antenna arrays for large-scale MIMO. The antennas 1737, for example, can be arranged into a matrix of antenna arrays, and are used by the radio communication interface 1733 to transmit and receive wireless signals.

In addition, the car navigation device 1720 may include an antenna 1737 for each wireless communication scheme. In this case, the antenna switch 1736 may be omitted from the configuration of the car navigation device 1720.

The battery 1738 supplies power to each block of the car navigation device 1720 shown in FIG. 24 via a feeder, and the feeder is partially shown as a dotted line in the figure. The battery 1738 accumulates power provided from the vehicle.

In the car navigation device 1720 shown in FIG. 24, one or more units included in the processing circuitry 101 (for example, the reporting unit 103) described with reference to FIG. 19A may be implemented in the radio communication interface 1733. Alternatively, at least a part of these components may be implemented in the processor 1721. As an example, the car navigation device 1720 includes a part (for example, the BB processor 1734) or the whole of the radio communication interface 1733, and/or a module including the processor 1721, and one or more components may be implemented in the module. In this case, the module may store a program that allows processing to function as one or more components (in other words, a program for allowing the processor to perform operations of one or more components), and may execute the program. As another example, a program for allowing the processor to function as one or more components may be installed in the car navigation device 1720, and the radio communication interface 1733 (for example, the BB processor 1734) and/or the processor 1721 may Execute the procedure. As described above, as a device including one or more components, a car navigation device 1720 or a module may be provided, and a program for allowing the processor to function as one or more components may be provided. In addition, a readable medium in which the program is recorded may be provided.

In addition, in the car navigation device 1720 as shown in FIG. 24, for example, the communication unit 106 described with reference to FIG. 19A can be implemented in the radio communication interface 1733 (e.g., the RF circuit 1735).

The technology of the present disclosure may also be implemented as an in-vehicle system (or vehicle) 1740 including one or more of a car navigation device 1720, an in-vehicle network 1741, and a vehicle module 1742. The vehicle module 1742 generates vehicle data such as vehicle speed, engine speed, and failure information, and outputs the generated data to the in-vehicle network 1741.

Although the illustrative embodiments of the present disclosure have been described with reference to the accompanying drawings, the present disclosure is certainly not limited to the above examples. Those skilled in the art may achieve various adaptions and modifications within the scope of the appended claims, and it will be appreciated that these adaptions and modifications certainly fall into the scope of the technology of the present disclosure.

For example, in the above embodiments, the multiple functions included in one module may be implemented by separate means. Alternatively, in the above embodiments, the multiple functions included in multiple modules may be implemented by separate means, respectively. In additions, one of the above functions may be implemented by multiple modules. Needless to say, such configurations are included in the scope of the technology of the present disclosure.

In this specification, the steps described in the flowcharts include not only the processes performed sequentially in chronological order, but also the processes performed in parallel or separately but not necessarily performed in chronological order. Furthermore, even in the steps performed in chronological order, needless to say, the order may be changed appropriately.

Although the present disclosure and its advantages have been described in detail, it will be appreciated that various changes, replacements and transformations may be made without departing from the spirit and scope of the present disclosure as defined by the appended claims. In addition, the terms "include", "comprise" or any other variants of the embodiments of the present disclosure are intended to be non-exclusive inclusion, such that the process, method, article or device including a series of elements includes not only these elements, but also those that are not listed specifically, or those that are inherent to the process, method, article or device. In case of further limitations, the element defined by the sentence "include one" does not exclude the presence of additional same elements in the process, method, article or device including this element.

What is claimed is:

1. An electronic device on a user side, comprising:
processing circuitry configured to
based on cell pre-configuration information, measure beams transmitted by a serving cell and at least one non-serving cell;
in response to a predefined measurement-based event, send a beam report including at least L1 measurements and identification information for one or more beams of one or more of the at least one non-serving cell to the serving cell via L1 or L2 signaling;
receive, from the serving cell and via L1 or L2 signaling, beam activation information indicating a specific beam of the one or more beams of the one or more of the at least one non-serving cell that the serving cell decides to activate based on the beam report;
determine an activated beam based on the indication of the specific beam in the beam activation information; and
set a non-serving cell associated with the activated beam determined based on the indication of the specific beam in the beam activation information as a set serving cell by:
switching from the serving cell to the non-serving cell associated with the activated beam determined based on the indication of the specific beam in the beam activation information, or adding the non-serving cell associated with the activated beam determined based on the indication of the specific beam in the beam activation information as a secondary serving cell.

2. The electronic device according to claim 1, wherein the cell pre-configuration information includes at least identification information for each of the serving cell and the at least one non-serving cell and reference signals corresponding to beams of the serving cell and the at least one non-serving cell.

3. The electronic device according to claim 1, wherein the cell pre-configuration information includes common configuration parameters for all of the serving cell and the at least one non-serving cell and configuration parameters specific to each of the serving cell and the at least one non-serving cell.

4. The electronic device according to claim 3, wherein the configuration parameters specific to each of the serving cell and the at least one non-serving cell in the cell pre-configuration information include:

a Transmission Configuration Indicator (TCI) state list configured individually for each Physical Cell Identifier (PCI), and for each TCI state in the list, a quasi-co-location (QCL) type D relationship between an intermediate reference signal of the non-serving cell and a measurement reference signal of the non-serving cell, and the processing circuitry is configured to determine the activated beam by applying the QCL type D relationship to a physical downlink control channel (PDCCH) of the non-serving cell.

5. The electronic device according to claim 1, wherein in a case where the beams transmit reference signals in L1, the predefined measurement-based event includes at least one of:

L1 measurement of a reference signal of the serving cell being worse than an absolute threshold;

L1 measurement of a reference signal of the at least one non-serving cell being better than L1 measurement of a reference signal of the serving cell by an amount of offset;

L1 measurement of a reference signal of the at least one non-serving cell being better than an absolute threshold; or L1 measurement of a reference signal of the serving cell being worse than an absolute threshold and L1 measurement of a reference signal of the at least one non-serving cell being better than another absolute threshold, and in a case where the beams transmit reference signals in L3, the predefined measurement-based event includes at least one of:

L3 measurement of a reference signal of the serving cell being worse than an absolute threshold;

L3 measurement of a reference signal of the at least one non-serving cell being better than L3 measurement of a reference signal of the serving cell by an amount of offset;

L3 measurement of a reference signal of the at least one non-serving cell being better than an absolute threshold; or L3 measurement of a reference signal of the serving cell being worse than an absolute threshold and L3 measurement of a reference signal of the at least one non-serving cell being better than another absolute threshold.

6. The electronic device according to claim 1, wherein the L1 or L2 signaling via which the beam report is sent includes UCI or a MAC CE.

7. The electronic device according to claim 1, wherein the beam report further includes at least one of:

an identifier of the at least one non-serving cell;

a type of the predefined measurement-based event.

8. The electronic device according to claim 1, wherein the identification information for each of the one or more beams includes an index of a reference signal corresponding to the respective beam or a TCI state referencing a reference signal corresponding to the respective beam.

9. The electronic device according to claim 1, wherein in response to the predefined measurement-based event, the processing circuitry is configured to:

trigger the sending of the beam report, and send the beam report on an available transmission resource or requests from the serving cell transmission resources for sending the beam report.

10. The electronic device according to claim 1, wherein the processing circuitry is further configured to:

in response to the predefined measurement-based event, select one non-serving cell of the at least one non-serving cell having the highest L1 measurement;

send a beam report regarding the one non-serving cell to the serving cell;

determine an activated beam of the one non-serving cell; and set the one non-serving cell as the set serving cell.

11. The electronic device according to claim 1, wherein the processing circuitry is further configured to:

receive, via L1 or L2 signaling and from the non-serving cell associated with the activated beam, beam indication information for PDCCH or PDSCH, which indicates that the activated beam is to be used for reception of subsequent PDCCH or PDSCH.

12. The electronic device according to claim 11, wherein the processing circuitry is configured to:

before a successful transmission is confirmed, repeat the sending of the beam report until a predetermined maximum number of transmissions.

13. The electronic device according to claim 1, wherein the beam activation information is received via a physical layer (L1) Downlink Control Information (DCI) or a Layer 2 L2) Medium Access Control (MAC) Control Element (CE), and the processing circuitry is further configured to, in response to receiving the beam activation information, initiate a Random Access Channel (RACH) procedure with the non-serving cell associated with the specific beam to establish an RRC connection while simultaneously maintaining a L1 or L2 signaling connection with the serving cell until a handover complete message is transmitted to the non-serving cell.

14. An electronic device on a control side, comprising:

processing circuitry configured to receive, from a user equipment (UE) and via L1 or L2 signaling, a beam report including at least L1 measurements and identification information for one or more beams of one or more non-serving cells;

determine an activated beam based on an indication of a specific beam in beam activation information for the specific beam of the one or more beams of the one or more non-serving cells that the control side decides to activate based on the beam report; and set a non-serving cell associated with the activated beam determined based on the indication of the specific beam in the beam activation information as a set serving cell by:

switching from a serving cell to the non-serving cell associated with the activated beam determined based on the indication of the specific beam in the beam activation information, or adding the non-serving cell associated with the activated beam determined based on the indication of the specific beam in the beam activation information as a secondary serving cell.

15. The electronic device according to claim 14, wherein the processing circuitry is further configured to:

send, to the UE and via L1 or L2 signaling, the beam activation information.

16. The electronic device according to claim 14, wherein the processing circuitry is further configured to:

send a switch request to the non-serving cell associated with the activated beam.

17. The electronic device according to claim 14, wherein the processing circuitry is further configured to:

send cell pre-configuration information to the UE, such that the UE can measure beams transmitted by the serving cell and at least one non-serving cell based on the cell pre-configuration information.

18. A communication method comprising:

based on cell pre-configuration information, measuring beams transmitted by a serving cell and at least one non-serving cell;

in response to a predefined measurement-based event, sending a beam report including at least L1 measurements and identification information for one or more beams of one or more of the at least one non-serving cell to the serving cell via L1 or L2 signaling;

receiving, from the serving cell and via L1 or L2 signaling, beam activation information indicating a specific beam of the one or more beams of the one or more of the at least one non-serving cell that the serving cell decides to activate based on the beam report;

determining an activated beam based on the indication of the specific beam in the beam activation information; and setting a non-serving cell associated with the activated beam determined based on the indication of the specific beam in the beam activation information as a set serving cell by:

switching from the serving cell to the non-serving cell associated with the activated beam determined based on the indication of the specific beam in the beam activation information, or adding the non-serving cell associated with the activated beam determined based on the indication of the specific beam in the beam activation information as a secondary serving cell.

19. A non-transitory computer readable storage medium storing executable instructions which, when executed, cause a computer to perform the communication method according to claim 18.

20. A communication method comprising:

receiving, from a user equipment (UE) and via L1 or L2 signaling, a beam report including at least L1 measurements and identification information for one or more beams of one or more non-serving cells;

determining an activated beam based on an indication of a specific beam in beam activation information for the specific beam of the one or more beams of the one or more non-serving cells that the control side decides to activate based on the beam report; and setting a non-serving cell associated with the activated beam determined based on the indication of the specific beam in the beam activation information as a set serving cell by:

switching from a serving cell to the non-serving cell associated with the activated beam determined based on the indication of the specific beam in the beam activation information, or adding the non-serving cell associated with the activated beam determined based on the indication of the specific beam in the beam activation information as a secondary serving cell.

\* \* \* \* \*